(12) United States Patent
Okamoto et al.

(10) Patent No.: US 10,170,077 B2
(45) Date of Patent: Jan. 1, 2019

(54) MULTI-PROJECTOR SYSTEM, PROJECTOR, METHOD FOR ADJUSTING IMAGE, AND COMPUTER PROGRAM PRODUCT

(71) Applicant: JVC KENWOOD Corporation, Yokohama-shi (JP)

(72) Inventors: Naoya Okamoto, Yokohama (JP); Ryosuke Nakagoshi, Kamakura (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 565 days.

(21) Appl. No.: 14/290,747

(22) Filed: May 29, 2014

(65) Prior Publication Data

US 2014/0354674 A1 Dec. 4, 2014

(30) Foreign Application Priority Data

May 31, 2013 (JP) .................. 2013-116390

(51) Int. Cl.
*G09G 5/02* (2006.01)
*G09G 3/00* (2006.01)
*H04N 9/31* (2006.01)
*G06F 3/14* (2006.01)

(52) U.S. Cl.
CPC ............. *G09G 5/02* (2013.01); *G06F 3/1423* (2013.01); *G09G 3/002* (2013.01); *G09G 3/006* (2013.01); *H04N 9/3147* (2013.01); *H04N 9/3182* (2013.01); *G09G 2320/0626* (2013.01); *G09G 2320/0666* (2013.01); *G09G 2320/0673* (2013.01); *G09G 2320/0693* (2013.01)

(58) Field of Classification Search
None
See application file for complete search history.

(56) References Cited

U.S. PATENT DOCUMENTS

| 6,480,175 | B1 * | 11/2002 | Schneider | G06F 3/1446 345/32 |
| 2002/0159035 | A1 * | 10/2002 | Koyama | H04N 5/44513 353/31 |
| 2006/0181685 | A1 * | 8/2006 | Hasegawa | G03B 37/04 353/69 |

FOREIGN PATENT DOCUMENTS

JP    2009-159372 A    7/2009

* cited by examiner

*Primary Examiner* — Aaron M Richer
(74) *Attorney, Agent, or Firm* — Venable LLP; Michael A. Sartori; Tamatane J. Aga

(57) ABSTRACT

Provided is a multi-projector system including: projectors; an image outputting apparatus; and an adjusting apparatus to adjust images. Each of the projectors includes: a light-emitting unit to emit the modulated light; and a color adjusting unit to adjust colors of the projected image. The image outputting apparatus includes an outputting unit to output the first adjustment image and the second adjustment image as the input images of the projectors. The adjusting apparatus includes: an imaging unit to take a projected image and to output a captured image; an analyzing unit to analyze an image of the overlapping area from the captured image so as to determine a color component; and a controller for controlling the color adjusting unit of the first projector so that the color of the overlapping area is an achromatic color in accordance with the color component determined as a result of the analysis.

10 Claims, 15 Drawing Sheets

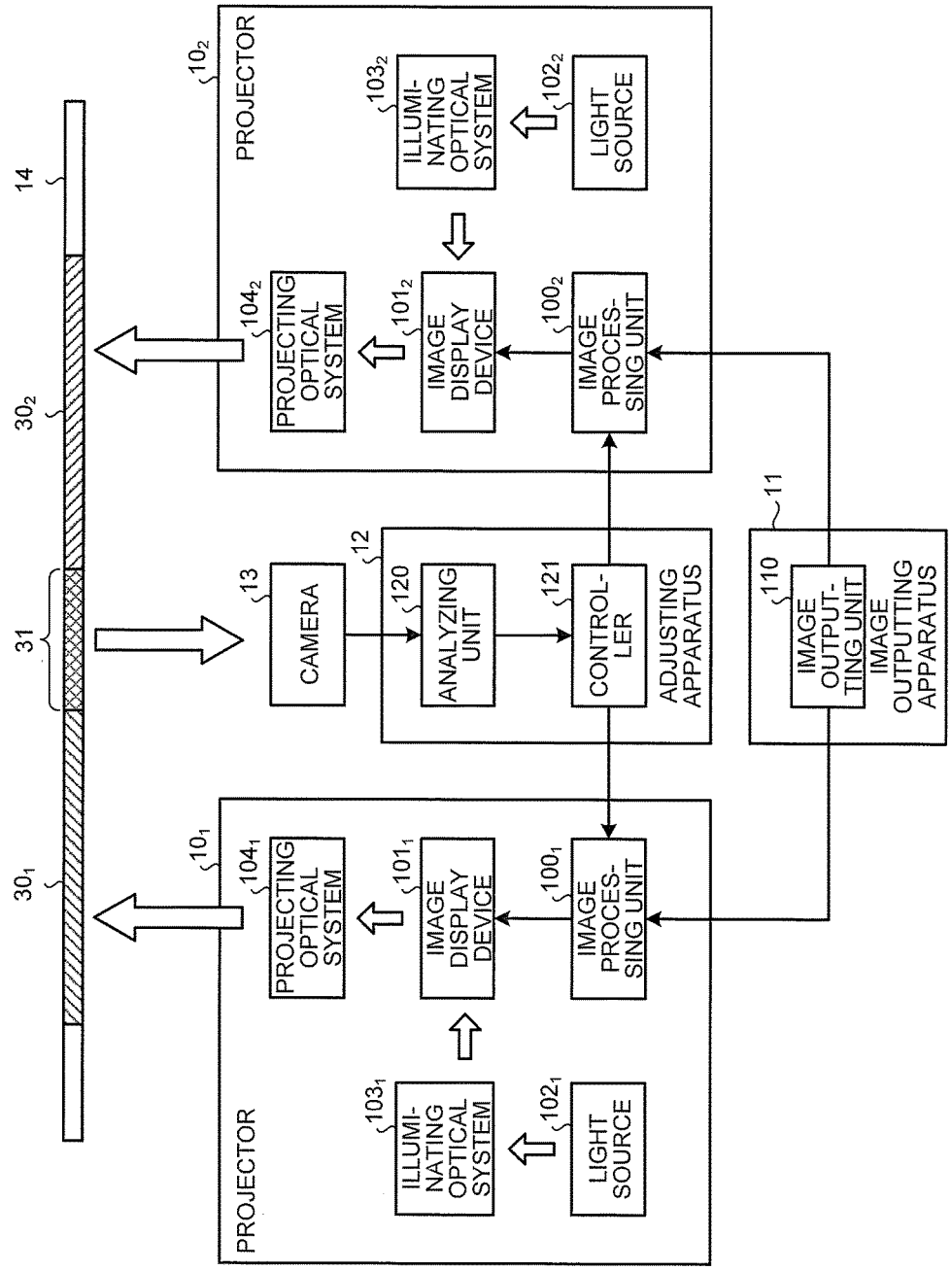

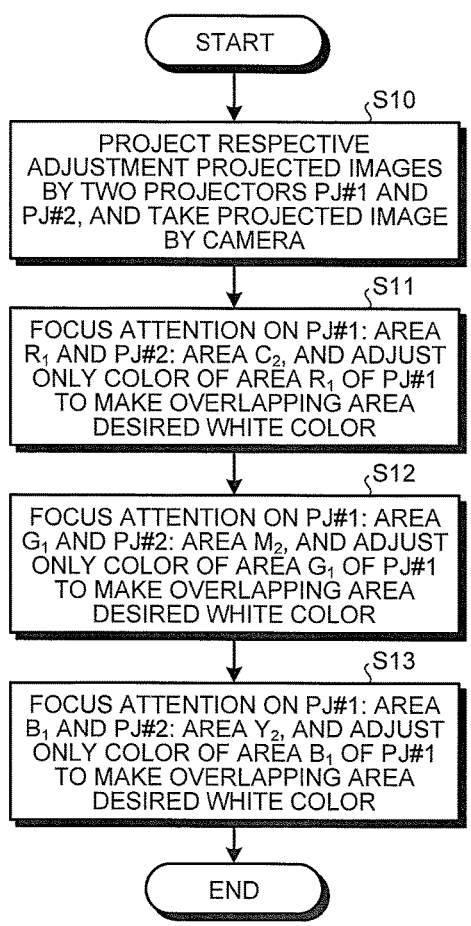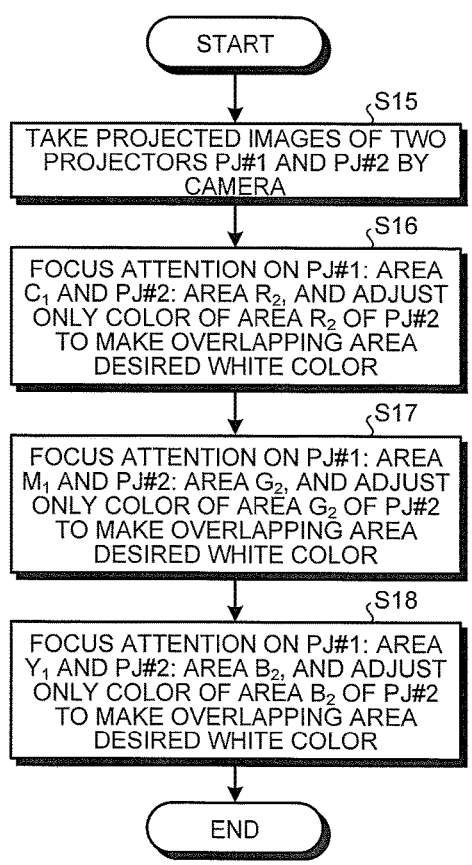

MULTI-PROJECTOR SYSTEM, PROJECTOR, METHOD FOR ADJUSTING IMAGE, AND COMPUTER PROGRAM PRODUCT

CROSS-REFERENCE TO RELATED APPLICATIONS

The present application claims priority to and incorporates by reference the entire contents of Japanese Patent Application No. 2013-116390 filed in Japan on May 31, 2013.

BACKGROUND OF THE INVENTION

1. Field of the Invention

The present invention relates to a multi-projector system, a projector, a method for adjusting an image, and a computer program product suitable to be used when simultaneously projecting a plurality of projected images onto one projection medium.

2. Description of the Related Art

When a projected image having a larger size than a projected image by one projector is necessary, for example, one large projected image as a whole has been obtained by simultaneously projecting a plurality of projected images by a plurality of projectors onto one screen. As an example, a landscape image is divided into two parts in the longitudinal direction, and the respective divided images are projected onto one screen in a laterally adjacent manner using two projectors. In this situation, a superimposed area may be provided in the adjacent part of the projected images.

When the projected images by the projectors are thus projected onto one screen simultaneously, the colors of the projected images are required to be matched between the projectors. The color matching in this situation is required with high precision, because human sight is sensitive to differences in colors between adjacent areas.

The color matching of projected images has been performed by projecting white images by the respective projectors and, based on the respective projected images, matching the white color between the projectors. Japanese Patent Application Laid-open No. 2009-159372 discloses a technology that adjusts each of the plurality of projectors so that the brightness and chromaticity of points close to each other between a plurality of projected images match in the projected images projected in an adjacent manner by the projectors.

However, the conventional method using the white projected images has the problem of difficulty in matching the R, G, and B colors between the projectors, although the white color can be matched between the projectors.

The technique disclosed in Japanese Patent Application Laid-open No. 2009-159372 needs to accurately measure brightness and chromaticity in projected images, which may require high precision of the measuring system and may involve an increase in apparatus costs.

SUMMARY OF THE INVENTION

There is a need to at least partially solve the problems in the conventional technology.

Provided is a multi-projector system including: two or more projectors including a first projector and a second projector; an image outputting apparatus configured to output respective images to the two or more projectors; and an adjusting apparatus configured to adjust images projected by the two or more projectors, wherein each of the projectors includes a light-emitting unit configured to modulate light from a light source in accordance with an input image so as to emit the modulated light as a projected image; and a color adjusting unit configured to control the input image in accordance with first control data so as to adjust colors of the projected image, the image outputting apparatus includes an outputting unit configured to arrange a primary color and a complementary color that are mutually complementary in two areas positioned correspondingly to each of a first adjustment image and a second adjustment image having respective areas obtained by dividing an image frame corresponding to the projected image in a predetermined direction and to output the first adjustment image and the second adjustment image as the input images of the first projector and the second projector respectively, and the adjusting apparatus includes an imaging unit configured to take a projected image projected onto a projection medium and to output a captured image; an analyzing unit configured to, when a first adjustment projected image projected onto the projection medium based on the first adjustment image by the first projector and a second adjustment projected image projected onto the projection medium based on the second adjustment image by the second projector are projected and arranged in the predetermined direction with the positions of the respective areas matched and when there is an overlapping area in the first adjustment projected image and the second adjustment projected image, analyze an image of the overlapping area from the captured image so as to determine a color component; and a controller configured to generate and output the first control data for controlling at least the color adjusting unit of the first projector so that the color of the overlapping area is an achromatic color in accordance with the color component determined as a result of the analysis by the analyzing unit.

Provided further is a projector, including: a light-emitting unit configured to modulate light from a light source in accordance with an input image to emit the modulated light as a projected image; a color adjusting unit configured to control the input image in accordance with control data to adjust chromaticity of the projected image; an imaging unit configured to take a projected image projected onto a projection medium and output a captured image; an analyzing unit configured to, when areas are provided by dividing an image frame corresponding to the projected image in a predetermined direction, two of which areas being positioned correspondingly to each other, a first adjustment projected image having a primary color and a complementary color that are mutually complementary projected from the projector, and a second adjustment projected image having a primary color and a complementary color that are mutually complementary projected from other projector, the first adjustment projected image projected onto the projection medium based on a first adjustment image and the second adjustment projected image projected onto the projection medium based on a second adjustment image being arranged in the predetermined direction with the positions of the respective areas matched, and when there is an overlapping area in the first adjustment projected image and the second adjustment projected image, analyze an image of the overlapping area from the captured image so as to determine a color component; and a controller configured to generate and output the control data for controlling the color adjusting unit so that the color of the overlapping area becomes an achromatic color in accordance with the color component determined as a result of the analysis by the analyzing unit.

Provided further is a method for adjusting an image, the method including: when areas are provided by dividing an image frame corresponding to a projected image in a predetermined direction, in two of the areas positioned correspondingly to each other, a first adjustment projected image projected onto a projection medium by a first projector based on a first adjustment image and a second adjustment projected image projected onto the projection medium by a second projector based on a second adjustment image are projected and arranged in the predetermined direction with the positions of the respective areas matched, the first adjustment image and the second adjustment image having a primary color and a complementary color respectively that are mutually complementary, and when there is an overlapping area in the first adjustment projected image and the second adjustment projected image, analyzing an image of the overlapping area from a captured image of projected images projected onto the projection medium so as to determine a color component; and generating and outputting control data for adjusting at least the color of the first adjustment projected image projected by the first projector so that the color of the overlapping area becomes an achromatic color in accordance with the color component determined as a result of the analysis at the analyzing.

Provided further is a computer program product including an image adjusting program that causes a computer to implement the method for adjusting an image mentioned above.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a block diagram illustrating an exemplary configuration of the multi-projector system according to the embodiment in more detail;

FIGS. 5A and 5B are flowcharts illustrating an example of color adjustment processing according to the first embodiment;

DETAILED DESCRIPTION OF THE PREFERRED EMBODIMENTS

The following describes preferable embodiments of a multi-projector system, a projector, an adjusting apparatus, a method for adjusting an image, and a computer program product including an image adjusting program according to the present embodiment with reference to the accompanying drawings. Specific numerical values, appearance configuration, and the like illustrated in the embodiments are only exemplified in order to facilitate understanding and do not limit the present embodiment unless otherwise specified. Elements that are not directly related to the present embodiment are omitted to be described in detail and illustrated.

First Embodiment

Figure 1:
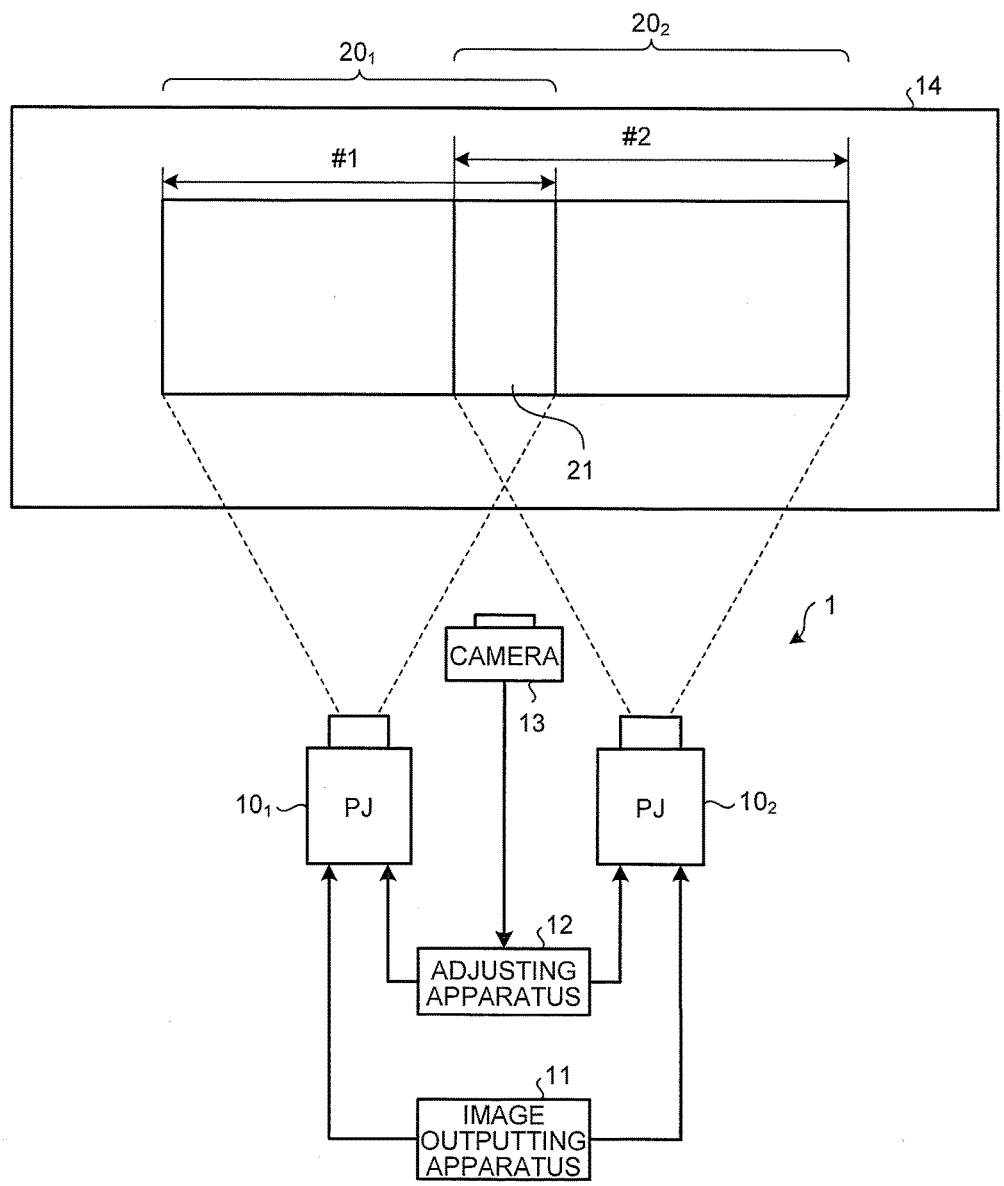
FIG. 1 is a diagram schematically illustrating a multi-projector system according to a first embodiment.

FIG. 1 schematically illustrates a multi-projector system according to an embodiment. This multi-projector system 1 illustrated in FIG. 1 includes a plurality of projectors (PJ) $10_1$ and $10_2$, an image outputting apparatus 11, an adjusting apparatus 12, and a camera 13.

The image outputting apparatus 11 outputs respective pieces of image data to the projectors $10_1$ and $10_2$. The projectors $10_1$ and $10_2$ input the respective pieces of image data output from the image outputting apparatus 11 as respective pieces of input image data. The projectors $10_1$ and $10_2$ perform certain image processing on the respective pieces of input image data to generate respective pieces of projected image data, modulates respective pieces of light from respective light sources by respective optical modulators based on the respective pieces of projected image data, and projects the respective pieces of modulated light onto a screen 14 as projected images $20_1$ and $20_2$.

When the projected images $20_1$ and $20_2$ from the two projectors $10_1$ and $10_2$ are to be projected onto the common screen 14, it is preferable that the colors of the projected images $20_1$ and $20_2$ be matched. Matching color gamuts between the projectors $10_1$ and $10_2$, for example, can match the colors between the projected images $20_1$ and $20_2$.

The multi-projector system 1 according to the embodiment determines the positions of the projected images $20_1$ and $20_2$ so that the projected images $20_1$ and $20_2$ partly overlap when the projectors $10_1$ and $10_2$ project the projected images $20_1$ and $20_2$, respectively, onto the screen 14. An image of an overlapping area 21 in which the projected images $20_1$ and $20_2$ overlap is taken by the camera 13. The color gamuts of the projectors $10_1$ and $10_2$ are adjusted based on a result obtained by analyzing captured image data, taken by the camera 13, with the adjusting apparatus 12, thereby matching the colors between the projected images $20_1$ and $20_2$.

Figure 2A:
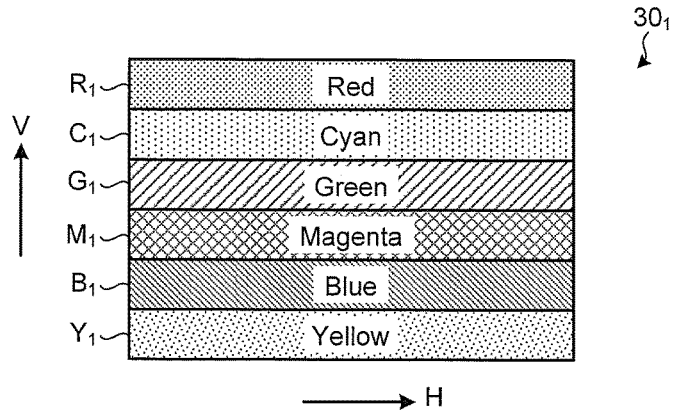
FIGS. 2A, 2B, and 2C are diagrams illustrating an example of a projected image by color-adjustment image data according to the first embodiment.
Figure 2B:
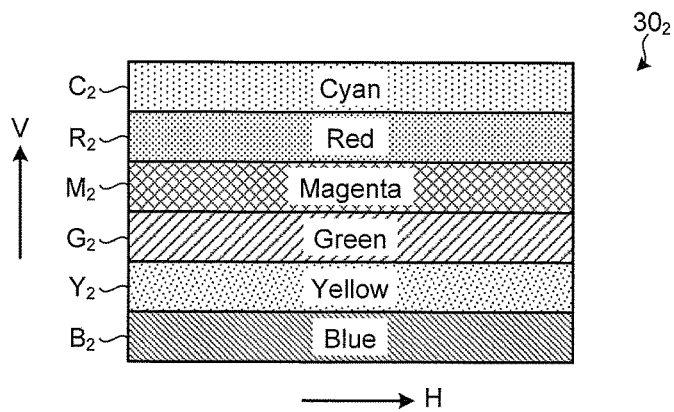

More specifically, the image outputting apparatus 11 outputs respective pieces of color-adjustment image data to the projectors $10_1$ and $10_2$. FIG. 2A and FIG. 2B illustrate examples of projected images that are based on the respective pieces of color-adjustment image data. FIG. 2A illustrates an example of a projected image $30_1$ by color-adjustment image data output from one projector (e.g., the projector $10_1$). FIG. 2B illustrates an example of a projected image $30_2$ by color-adjustment image data output from the other projector (e.g., the projector $10_2$).

The projected image that is based on adjustment image data is referred to as an adjustment projected image below unless otherwise specified. In FIGS. 2A and 2B, and similar drawings below, the longitudinal direction is an image vertical direction V, whereas the lateral direction is an image horizontal direction H.

The adjustment projected images $30_1$ and $30_2$ include respective color bars in the image horizontal direction including R (red), G(green), and B (blue) as the primary three colors; and C (cyan), M (magenta), and Y yellow) which are complementary colors of these three primary colors respectively. In this example, in the adjustment projected images $30_1$ and $30_2$, image frames corresponding to the adjustment projected images $30_1$ and $30_2$ are divided into six areas in the vertical direction, and the RGB colors as the primary three colors and the CMY colors as the complementary colors of the three primary colors are arranged in the respective divided areas. The respective areas are configured so that when the adjustment projected image $30_1$ and the adjustment projected image $30_2$ are projected with their vertical sizes matched, their respective vertical sizes match to each other.

In the adjustment projected images $30_1$ and $30_2$ according to the embodiment, areas vertically positioned correspondingly within the respective adjustment projected images $30_1$ and $30_2$ are configured so that when the adjustment projected images $30_1$ and $30_2$ are made adjacent to each other with their vertical sizes being matched and with their projection heights being matched, mutually complementary colors are arranged in the respective areas positioned correspondingly.

As an example, as illustrated in FIG. 2A, the adjustment projected image $30_1$ has the respective areas so as to be an area $R_1$ of the R color, an area $C_1$ of the C color, an area $G_1$ of the G color, an area $M_1$ of the M color, an area $B_1$ of the B color, and an area $Y_1$ of the Y color from the top in this order. As illustrated in FIG. 2B, the adjustment projected image $30_2$ has the respective areas so as to be an area $C_2$ of the C color, an area $R_2$ of the R color, an area $M_2$ of the M color, an area $G_2$ of the G color, an area $Y_2$ of the Y color, and an area $B_2$ of the B color from the top in this order.

The colors of the respective areas of the adjustment projected images $30_1$ and $30_2$ are arranged as illustrated in FIG. 2A and FIG. 2B. This can make the colors of a pair of two areas, which are vertically positioned correspondingly in the respective adjustment projected images $30_1$ and $30_2$, mutually complementary colors when the adjustment projected images $30_1$ and $30_2$ are matched in vertical size and are made adjacent to each other with their projection heights matched.

Specifically, the area $R_1$ at the topmost of the adjustment projected image $30_1$ and the pairing area $C_2$ at the topmost of the adjustment projected image $30_2$ positioned correspondingly with the area $R_1$ have the R color and the C color, which are mutually complementary colors. Similarly, the next area $C_1$ of the adjustment projected image $30_1$ and the pairing area $R_2$ positioned correspondingly with the area $C_1$ have the C color and the R color, which are mutually complementary colors. Also for the areas $G_1$, $M_1$, $B_1$, and Y1 of the adjustment projected image $30_1$ and for the areas $M_2$, $G_2$, $Y_2$, and $B_2$ of the adjustment projected image $30_2$, the colors of a pair of two areas positioned correspondingly are mutually complementary colors.

It is known in the additive color mixture that the mixing of mutually complementary colors gives an achromatic color. Because the C color that is complementary to the R color is obtained by the additive color mixture of the G color and the B color, for example, the mixing of the R color and the C color is equivalent to the mixing of the R color, the G color, and the B color which are the three primary colors and theoretically gives a white color.

Figure 2C:
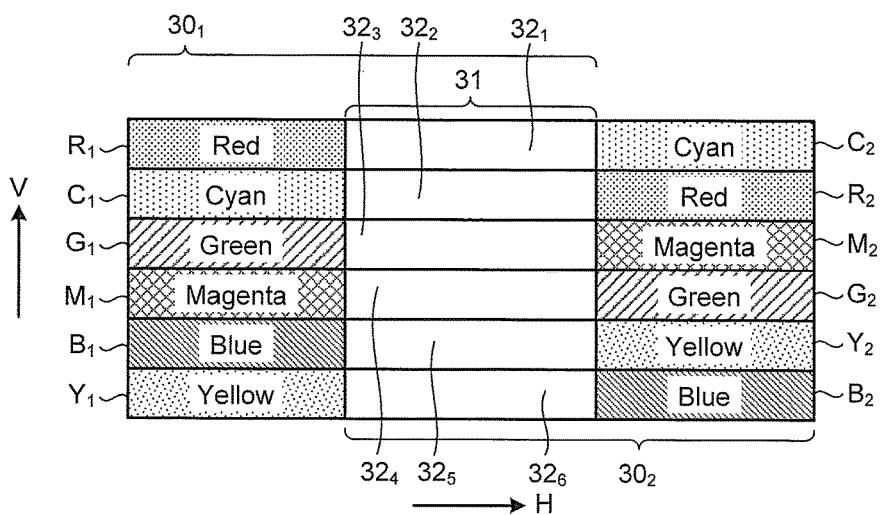

The embodiment performs color adjustment of projected images using this relation about the complementary colors. Specifically, as exemplified in FIG. 2C, the adjustment projected images $30_1$ and $30_2$ are projected with their projection heights matched and with the vertical sizes of the projected images matched, so that an overlapping area 31 is formed so as for the adjustment projected images $30_1$ and $30_2$ to overlap. By projecting the adjustment projected images $30_1$ and $30_2$, the respective mutually complementary areas overlap in the overlapping area 31.

The overlapping area 31 contains overlapping areas $32_1$, $32_2$, $32_3$, $32_4$, $32_5$, and $32_6$ in which the respective mutually complementary areas overlap. In the example in FIG. 2C, the area $R_1$ and the area $C_2$ overlap to form the overlapping area $32_1$. The area $C_1$ and the area $R_2$ overlap to form the overlapping area $32_2$. The area $G_1$ and the area $M_2$ overlap to form the overlapping area $32_3$. The area $M_1$ and the area $G_2$ overlap to form the overlapping area $32_4$. The area $B_1$ and the area $Y_2$ overlap to form the overlapping area $32_5$. The area $Y_1$ and the area $B_2$ overlap to form the overlapping area $32_6$.

In the formed overlapping area 31, when the color gamut output from the projectors $10_1$ and $10_2$ are the same, the colors of the respective overlapping areas $32_1$ to $32_6$ within the overlapping area 31 are a white color or an achromatic color.

The embodiment matches the colors between the projectors $10_1$ and $10_2$ using this property. Specifically, image data of the overlapping area 31 is extracted from captured image data taken by the camera 13; and then the image data is analyzed by the adjusting apparatus 12 to determine color components of the respective areas obtained by dividing the adjustment projected images $30_1$ and $30_2$ in order to arrange the respective R, G, B, C, M, and Y colors. When any of the color components determined in the respective areas is not within a certain range with respect to the white color or achromatic color, the adjusting apparatus 12 generates control data for correcting a primary color (the R color, G color, or B color) corresponding to the area concerned. This control data is supplied to a projector that is projecting the primary color corresponding to the area concerned.

The projectors $10_1$ and $10_2$ can adjust the hues of the respective R color, G color, and B color in accordance with the control data from the outside. To adjust the hue of the R color by the projector $10_1$, for example, a position representing a new R color is moved from a position representing the original R color to the G-color direction or the B-color direction on a side of the color gamut of the projector $10_1$ in accordance with the control data. In this case, the new R color is a composite color of the original R color and the G color or the B color. The projector $10_1$ performs coordinate transformation in the color space by the RGB colors in accordance with the control data and changes the color gamut, thereby correcting the color of the projected image.

Although the above describes that the adjustment projected images $30_1$ and $30_2$ are equally divided in the vertical direction to arrange the respective colors, the division is not limited to this example. Specifically, when the adjustment projected images $30_1$ and $30_2$ are arranged and projected so that the overlapping area 31 is formed, they are not necessarily equally divided as long as the two complementary areas overlap. Although the above describes that the respective colors are arranged in the entire of the adjustment projected images $30_1$ and $30_2$, the division is not limited to this example, and the respective colors may be arranged partly in the vertical direction. As for also the horizontal direction, there is no need to use the entire width of the adjustment projected images $30_1$ and $30_2$, and only part necessary for forming the overlapping area 31 may be used.

Although the above divides the adjustment projected images $30_1$ and $30_2$ in the longitudinal direction to form the respective areas for arranging the respective colors, the division is not limited to this example. Specifically, it is also considered that the projectors $10_1$ and $10_2$ project the projected images $20_1$ and $20_2$ longitudinally arranged onto the screen 14. In this case, the adjustment projected images $30_1$ and $30_2$ may be divided in the lateral direction to form the respective areas arranging the respective colors.

FIG. 3 illustrates an exemplary configuration of the multi-projector system 1 according to the embodiment in more detail. In FIG. 3, the parts common to FIG. 1 are given the same reference numerals and are omitted to be described in detail.

The image outputting apparatus 11 includes an image outputting unit 110. The image outputting unit 110 outputs the respective pieces of image data for projecting the adjustment projected images $30_1$ and $30_2$ illustrated in FIG. 2. The respective pieces of image data are supplied to the projectors $10_1$ and $10_2$ as input image data.

The image outputting unit 110 may generate and output respective pieces of projected image data through a certain program or may read projected image data stored in a read only memory (ROM) or the like in advance and output the projected image data. Although FIG. 3 illustrates the image outputting apparatus 11 serving as a component common to the projectors $10_1$ and $10_2$, the configuration is not limited to this example. For example, each image outputting apparatus 11 may be provided for each of the projectors $10_1$ and $10_2$.

The projector $10_1$ includes an image processing unit $100_1$, an image display device $101_1$, a light source $102_1$, an illuminating optical system $103_1$, and a projecting optical system $104_1$. Similarly, the projector $10_2$ includes an image processing unit $100_2$, an image display device $101_2$, a light source $102_2$, an illuminating optical system $103_2$, and a projecting optical system $104_2$. The projectors $10_1$ and $10_2$ can thus be constructed by the common configuration, and the projector $10_1$ is described as an example below.

In the projector $10_1$, light emitted from the light source $102_1$ enters the image display device $101_1$ through the illuminating optical system $103_1$. The image processing unit $100_1$ performs certain image processing on the input image data input to the projector $10_1$; and outputs the input image data to the image display device $101_1$ as projected image data.

The image processing unit $100_1$ performs certain image processing on the projected image data for projecting the adjustment projected image $30_1$ supplied from the image outputting apparatus 11 as the input image data. In this situation, the image processing unit $100_1$ adjusts the color of an image that is based on the input image data in accordance with control data supplied from a controller 121 of the adjusting apparatus 12 to be described below and outputs the input image data with the color adjusted as the projected image data.

The image display device $101_1$ is a liquid crystal on silicon (LCOS), for example, and modulates incident light in accordance with image data and emits the light. The image display device $101_1$ modulates and emits light emitted from the illuminating optical system $103_1$ in accordance with the projected image data provided from the image processing unit $100_1$. The light emitted from the image display device $101_1$ is projected onto the screen 14 through the projecting optical system $104_1$ as a projected image. When the input image data input to the image processing unit $100_1$ is the image data for projecting the adjustment projected image $30_1$ output from the image outputting apparatus 11, the adjustment projected image $30_1$ is projected onto the screen 14.

The adjustment projected image $30_2$ is similarly projected onto the screen 14 from the projector $10_2$. Here, the adjustment projected images $30_1$ and $30_2$ are projected onto the screen 14 with their projection heights with respect to the screen 14 matched and with their vertical sizes matched. Furthermore, the adjustment projected images $30_1$ and $30_2$ are projected onto the screen 14 so that the overlapping area 31 is formed.

The adjusting apparatus 12 includes an analyzing unit 120 and the controller 121. The analyzing unit 120 extracts the image data of the overlapping area 31 out of captured image data taken by the camera 13 so as to contain the overlapping area 31 on the screen 14 and analyzes the image data extracted. In this analysis, the analyzing unit 120 determines color components of the respective parts corresponding to the respective areas in which the respective colors of the adjustment projected images $30_1$ and $30_2$ are arranged in the extracted image data. The data indicating the determined color components of the respective parts is supplied to the controller 121.

Based on the data indicating the color components of the respective parts supplied from the analyzing unit 120, the controller 121 generates control data for adjusting the colors of the adjustment projected images $30_1$ and $30_2$. The control data for adjusting the colors of the adjustment projected image $30_1$ is supplied to the image processing unit $100_1$ of the projector $10_1$. The control data for adjusting the colors of the adjustment projected image $30_2$ is supplied to the image processing unit $100_2$ of the projector $10_2$.

Figure 4:
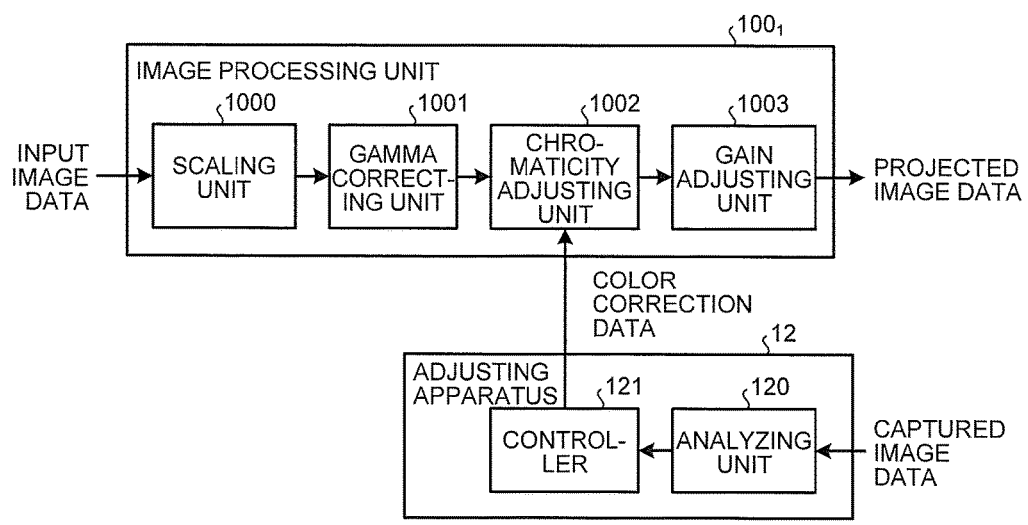
FIG. 4 is a block diagram illustrating an exemplary configuration of an image processing unit according to the first embodiment.

FIG. 4 illustrates an exemplary configuration of the image processing unit $100_1$ according to the first embodiment. The image processing unit $100_2$ of the projector $10_2$ can be made by the same configuration as this image processing unit $100_1$, and the image processing unit $100_1$ is described as a representative. In FIG. 4, the parts common to FIG. 3 are given the same reference numerals and are omitted to be described in detail.

The image processing unit $100_1$ includes a scaling unit 1000, a gamma correcting unit 1001, a chromaticity adjusting unit 1002, and a gain adjusting unit 1003. Input image data is input to the scaling unit 1000 to be subjected to grayscale processing, and is further subjected to gamma correction processing by the gamma correcting unit 1001. The input image data after being subjected to the gamma correction processing is input to the chromaticity adjusting unit 1002.

The control data output from the controller 121 of the adjusting apparatus 12 is input to the chromaticity adjusting unit 1002 as color collecting data. The chromaticity adjusting unit 1002 adjusts each of the RGB colors in accordance with the input color correction data and updates the color gamut thereof. The chromaticity adjusting unit 1002 performs color conversion processing appropriate for the updated color gamut on the input image data input from the gamma correcting unit 1001. The input image data, after being subjected to the color conversion processing, is subjected to gain adjustment by the gain adjusting unit 1003 and is output from the image processing unit 100$_1$ as the projected image data.

Described next is color adjustment processing performed by the configuration described above. FIGS. 5A and 5B are flowcharts illustrating an example of the color adjustment processing according to the first embodiment. FIG. 5A illustrates a flowchart for processing to match hues between the adjustment projected images 30$_1$ and 30$_2$, whereas FIG. 5B illustrates a flowchart for further performing processing to match chromas therebetween after having matched the hues by the processing illustrated by the flowchart in FIG. 5A.

In FIG. 5A and FIG. 5B, the projectors 10$_1$ and 10$_2$ are denoted by projectors PJ#1 and PJ#2, respectively.

Before executing the respective pieces of processing of the flowcharts of FIG. 5A and FIG. 5B, the brightnesses of pieces of projecting light of the projectors 10$_1$ and 10$_2$ are to be matched.

Before the processing of each of the flowcharts, the color component of a standard white color is to be determined. Using one of the projectors 10$_1$ and 10$_2$, for example, a white image is projected onto the screen 14. In the example in FIG. 5A, the color of the projector 10$_1$ is adjusted, and thus the standard white color is determined based on the projecting light of the projector 10$_2$. A projected image that is based on this white image is taken by the camera 13, and then the captured image data is analyzed by the analyzing unit 120 to determine the color component of the projected image. The controller 121 uses this color component as the color component of the standard white color.

As illustrated at Step S10 in FIG. 5A, the two projectors 10$_1$ and 10$_2$ project the adjustment projected images 30$_1$ and 30$_2$ onto the screen 14 so that the overlapping area 31 is formed. The projected images are taken by the camera 13 so as to contain the overlapping area 31. The captured image data of the projected images is supplied to the adjusting apparatus 12 and is then input to the analyzing unit 120. In a case where the image of the overlapping area 31 is present in the captured image data, the analyzing unit 120 determines the color components of the respective overlapping areas 32$_1$ to 32$_6$ contained in the overlapping area 31.

When the captured image data does not contain the image of the overlapping area 31, the analyzing unit 120 may be configured to output some error message.

At the next Step S11, the controller 121, regarding the area R$_1$ of the projector 10$_1$ and the area C$_2$ of the projector 10$_2$, generates the control data that adjusts only the color of the area R$_1$ of the projector 10$_1$ so as to make the color of the overlapping area 32$_1$, in which the area R$_1$ and the area C$_2$ overlap, a desired white color, that is, the standard white color.

At the next Step S12, the controller 121, regarding the area G$_1$ of the projector 10$_1$ and the area M$_2$ of the projector 10$_2$, generates the control data that adjusts only the color of the area G$_1$ of the projector 10$_1$ so as to make the color of the overlapping area 32$_3$, in which the area G$_1$ and the area M$_2$ overlap, the desired white color.

Furthermore, at the next Step S13, the controller 121, regarding the area B$_1$ of the projector 10$_1$ and the area Y$_2$ of the projector 10$_2$, generates the control data that adjusts only the color of the area B$_1$ of the projector 10$_1$ so as to make the color of the overlapping area 32$_5$, in which the area B$_1$ and the area Y$_2$ overlap, the desired white color.

By thus executing the pieces of processing at Step S11 to Step S13, the hues of the projected images are matched between the projector 10$_1$ and the projector 10$_2$.

After matching the hues by the processing of the flowchart in FIG. 5A, when further matching the chromas, the processing of the flowchart in FIG. 5B is performed. In the flowchart in FIG. 5B, at Step S15, the projected images are taken by the camera 13 so as to contain the overlapping area 31. The captured image data of the projected image is supplied to the adjusting apparatus 12 and is then analyzed by the analyzing unit 120 to determine the color components of the respective overlapping areas 32$_1$ to 32$_6$ contained in the overlapping area 31.

At the next Step S16, the controller 121, regarding the area C$_1$ of the projector 10$_1$ and the area R$_2$ of the projector 10$_2$, generates the control data that adjusts only the color of the area R$_2$ of the projector 10$_2$ so as to make the color of the overlapping area 32$_2$, in which the area C$_1$ and the area R$_2$ overlap, the desired white color.

At the next Step S17, the controller 121, regarding the area M$_1$ of the projector 10$_1$ and the area G$_2$ of the projector 10$_2$, generates the control data that adjusts only the color of the area G$_2$ of the projector 10$_2$ so as to make the color of the overlapping area 32$_4$, in which the area M$_1$ and the area G$_2$ overlap, the desired white color.

Furthermore, at the next Step S18, the controller 121, regarding the area Y$_1$ of the projector 10$_1$ and the area B$_2$ of the projector 10$_2$, generates the control data that adjusts only the color of the area B$_2$ of the projector 10$_2$ so as to make the color of the overlapping area 32$_6$, in which the area Y$_1$ and the area B$_2$ overlap, the desired white color.

By thus executing the pieces of processing at Step S16 to Step S18, the chromas of the projected images are matched between the projector 10$_1$ and the projector 10$_2$. As a result, together with the processing of the flowchart in FIG. 5A, the hues and chromas of the projected images are matched between the projector 10$_1$ and the projector 10$_2$.

The processing of FIG. 5A and FIG. 5B described above is described more specifically with reference to FIG. 6. FIG. 6A to FIG. 6D illustrate a color gamut 200 of the projector 10$_1$ and a color gamut 201 of the projector 10$_2$ on xy-chromaticity diagrams. Points R$_1$, G$_1$, B$_1$, R$_2$, G$_2$, B$_2$, C$_1$, and C$_2$ on the xy-chromaticity diagrams correspond to the colors of the areas R$_1$, G$_1$, B$_1$, R$_2$, G$_2$, B$_2$, C$_1$, and C$_2$ on the adjustment projected images 30$_1$ and 30$_2$, respectively. In FIG. 6A to FIG. 6D, a point W$_0$ indicates the desired white color, that is, the standard white color.

Figure 6A:
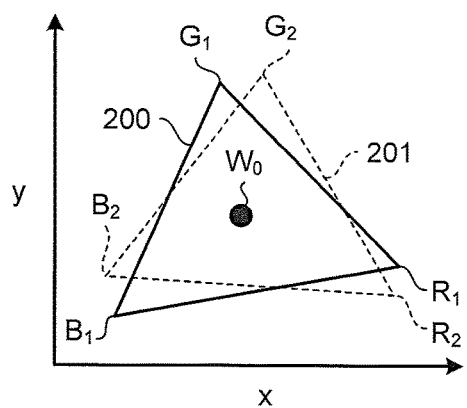
FIGS. 6A, 6B, 6C, and 6D are diagrams for illustrating the color adjustment processing according to the first embodiment in more detail.

FIG. 6A illustrates an example of the respective color gamuts 200 and 201 before performing the processing illustrated in FIG. 5A and FIG. 5B. The color gamut 200 has the points R$_1$, G$_1$, and B$_1$ as its apexes, whereas the color gamut 201 has the points R$_2$, G$_2$, and B$_2$ as its apexes. As illustrated in this drawing, before performing the processing, the colors R$_1$, G$_1$, and B$_1$ differ from the colors R$_2$, G$_2$, and B$_2$, respectively; and the color gamuts 200 and 201 do not match. This indicates that the projected images by the projectors 10$_1$ and 10$_2$ are different in color representation.

Figure 6B:
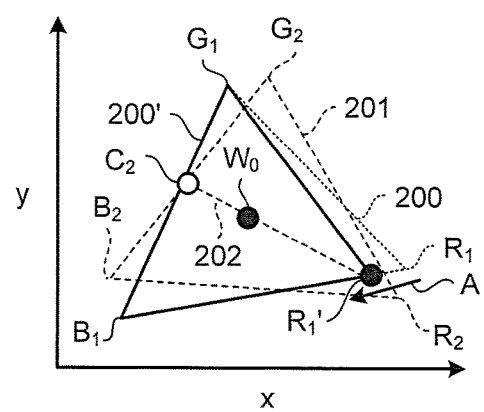

FIG. 6B illustrates an example of the processing of the flowchart in FIG. 5A. Described is an example in which the color of the area R$_1$ (point R$_1$) is adjusted at Step S11. Here, the color component of the overlapping area 32$_1$ in which the area R$_1$ and the area C$_2$ overlap is to be seen. When the point W$_0$ is on a certain point on a line connecting the point C$_2$ and the point R$_1$, the color component of the overlapping area $32_1$ indicates the standard white color. Thus, on the xy-chromaticity diagram, with the position of the point $C_2$ fixed, the position of the point $R_1$ on the xy-chromaticity diagram is moved so that the line connecting the point $C_2$ and the point $R_1$ passes through the point $W_0$.

Specifically, as exemplified in FIG. 6B, the point $R_1$ is moved on a side of the color gamut 200 in a direction of an arrow A, for example, and thus a line 202 connecting the point $C_2$ and the point $R_1$ is set to pass through the point $W_0$. This updates the color gamut 200 of the projector $10_1$ to a color gamut 200' having a point $R_1$' obtained by moving the point $R_1$ as a new apex. This processing is performed for all the points $R_1$, $G_1$, and $B_1$.

Figure 6C:
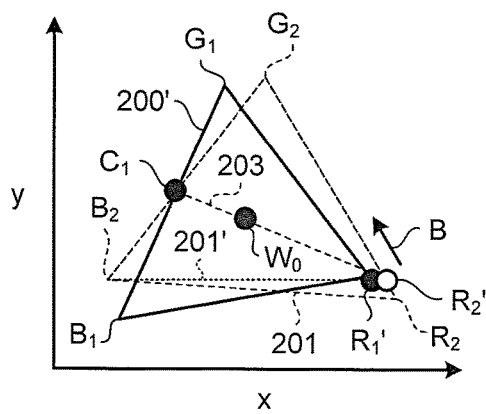

FIG. 6C illustrates the processing of the flowchart in FIG. 5B after performing the processing in FIG. 5A. For description, suppose that only the point $R_1$ has been moved in the flowchart in FIG. 5A.

The color of the area $R_2$ (point $R_2$) is supposed to be adjusted in Step S16, for example. In this case, the color component of the overlapping area $32_2$ in which the area $R_2$ and the area $C_1$ of the point $C_1$' of the C color in the color gamut 200' updated by the flowchart in FIG. 5A is seen. In the same manner as described above, with the position of the point $C_1$' fixed on the xy-chromaticity diagram, the position of the point $R_2$ on the xy-chromaticity diagram is moved so that the line connecting the point $C_1$' and the point $R_2$ passes through the point $W_0$.

Specifically, in the same manner as described above, the point $R_2$ is moved on a side of the color gamut 201 in a direction of an arrow B, and thus a line 203 connecting the point $C_1$' and the point $R_2$ is set to pass through the point $W_0$. This updates the color gamut 201 of the projector $10_2$ to a color gamut 201' having a point $R_2$' obtained by moving the point $R_2$ as a new apex. This processing is to be performed for all the points $R_2$, $G_2$, and $B_2$.

Figure 6D:
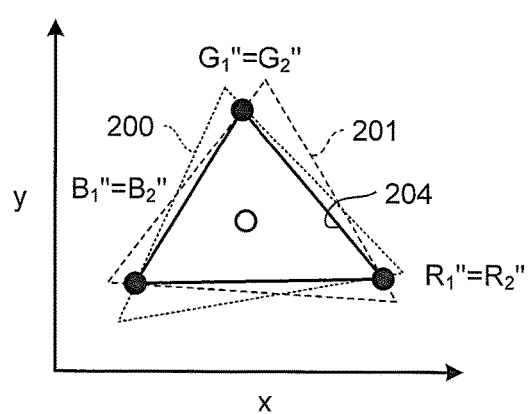

By thus performing the pieces of processing of the flowcharts in FIG. 5A and FIG. 5B, as exemplified in FIG. 6D, the points $R_1$", $G_1$", and $B_1$" which are updated apexes of the color gamut 200 of the projector $10_1$ and the points $R_2$", $G_2$", and $B_2$" which are updated apexes of the color gamut 201 of the projector $10_2$ each respectively match, thus giving a color gamut 204 matched between the projectors $10_1$ and $10_2$.

The embodiment performs the adjustment using only the color components of the respective overlapping areas $32_1$ to $32_6$ without using the color components of the respective colors $R_1$, $G_1$, $B_1$, $R_2$, $G_2$, and $B_2$. For this reason, when the point $R_1$ is moved for example, it is only shown that the point indicating the color component of the overlapping area $32_1$ in which the areas $R_1$ and $C_2$ overlap has moved in what direction and to what extent with respect to the point $W_0$ on the xy-chromaticity diagram along with the movement of the point $R_1$.

In view of the above circumstances, actually, by performing an extremum-seeking control (so called hill-climbing control) on the xy-chromaticity diagram for example, may be performed the control that determines whether the color component of the overlapping area $32_1$ falls within a certain range with respect to the color component of the standard white color. After performing the pieces of processing at Step S11 to Step S13 of the flowchart in FIG. 5A for example, it is determined whether the colors of the respective overlapping areas $32_1$, $32_3$, and $32_5$ fall within a certain range with respect to the standard white color, and when it is determined that they do not fall therewithin, the processing returns to Step S10. The same applies to the flowchart in FIG. 5B.

Figure 7:
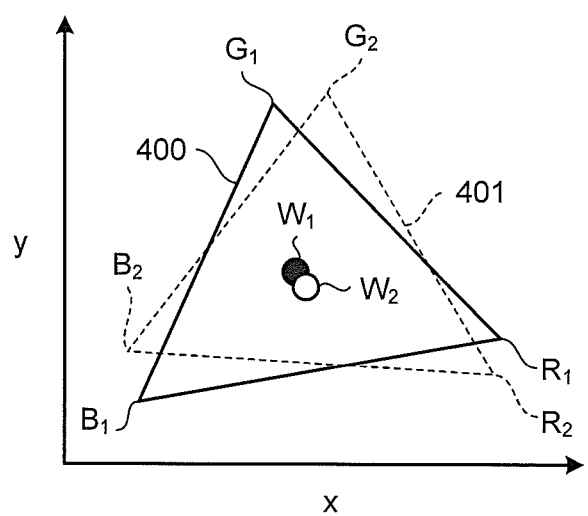
FIG. 7 is a diagram for illustrating a case in projected images by two projectors when they are different in the chromaticity of the RGB colors even when they are nearly the same in their respective white colors.

As exemplified in FIG. 7, in projected images by the two projectors $10_1$ and $10_2$, even when their respective white colors $W_1$ and $W_2$ are nearly the same, the chromaticities of the respective RGB colors may differ as illustrated as color gamuts 400 and 401. In this case, it is difficult to match the RGB colors by using only the white colors as seen in conventional technologies.

The first embodiment uses the property that the part in which mutually complementary colors overlap is a white color or an achromatic color, and thus can perform simultaneous processing to match the white colors and the processing to match the RGB colors of the projected images by the two projectors $10_1$ and $10_2$.

It is also considered that the RGB colors are directly compared between the adjustment projected images $30_1$ and $30_2$ to perform color adjustment. In this case, however, there is a risk that color adjustment will not be correctly performed due to the influence of color saturation of an imaging element contained in the camera 13. In other words, in general, there are tendencies that a red color is likely to cause color saturation and that a white color is not likely to cause color saturation. For this reason, when the RGB colors are directly compared to perform color adjustment, the red color may cause color saturation in the camera 13, leading to the failure to perform color adjustment correctly. The first embodiment adjusts the white color in the overlapping area 31 in which the adjustment projected images $30_1$ and $30_2$ overlap, and thus performs color adjustment while reducing the influence of color saturation.

Second Embodiment

Next, second embodiment is described. The first embodiment described above supposes that the brightnesses of the projecting light are matched between the projectors $10_1$ and $10_2$. The second embodiment further adds areas for measuring the brightness of the projecting light to adjustment projected images, matches the brightnesses of the projecting light between the projectors $10_1$ and $10_2$ based on an analysis result of captured image data of an image of that area, and then performs color adjustment in the same manner as the first embodiment.

Figure 8:
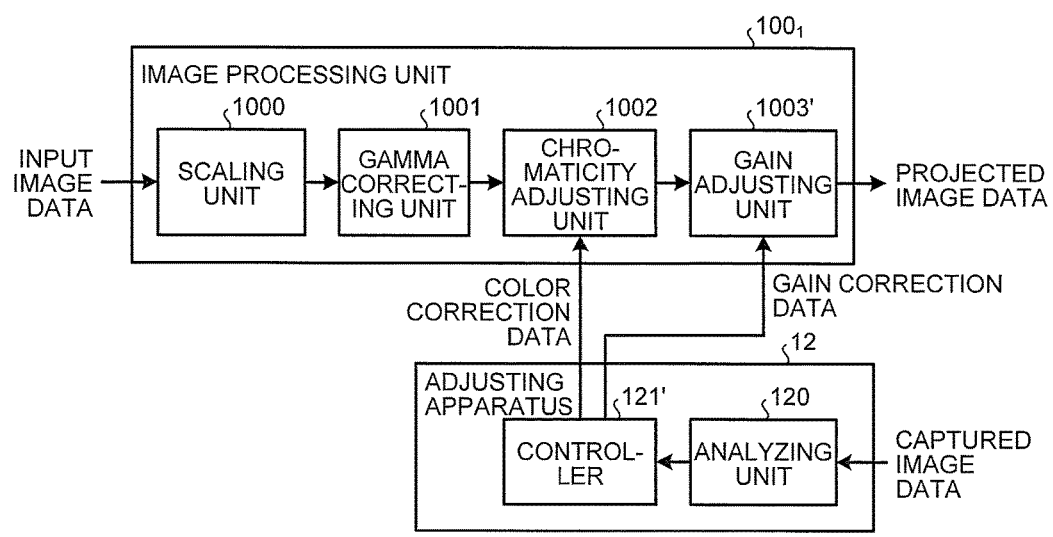
FIG. 8 is a block diagram illustrating an exemplary configuration of an adjusting apparatus and an image processing unit according to a second embodiment.

FIG. 8 illustrates an exemplary configuration of the image processing unit $100_1$ of the projectors $10_1$. The image processing unit $100_2$ of the projector $10_2$ can be constructed by the same configuration as the image processing unit $100_1$, and it is omitted to be described in this embodiment. In FIG. 8, the parts common to FIG. 4 are given the same reference numerals and are omitted to be described in detail.

The adjusting apparatus 12 includes the analyzing unit 120 and a controller 121'. The image processing unit $100_1$ includes the scaling unit 1000, the gamma correcting unit 1001, the chromaticity adjusting unit 1002, and a gain adjusting unit 1003'.

In the adjusting apparatus 12, based on the data indicating the color components of the respective parts supplied from the analyzing unit 120, the controller 121' generates first control data for adjusting the colors of the adjustment projected images $30_1$ and $30_2$. The first control data is supplied to the chromaticity adjusting unit 1002 of the image processing unit $100_1$ as color correction data.

The controller 121' further generates second control data for controlling the brightnesses of the projecting light of the projectors $10_1$ and $10_2$. The second control data is supplied to the gain adjusting unit 1003' as gain correction data. The gain adjusting unit 1003' performs gain correction on the image data supplied from the chromaticity adjusting unit 1002 in accordance with this gain correction data and outputs the image data as projected image data. The gain correction is performed, for example, by multiplying the components of the respective RGB colors of the image data with coefficients indicated by the gain correction data (the second control data).

Figure 9A:
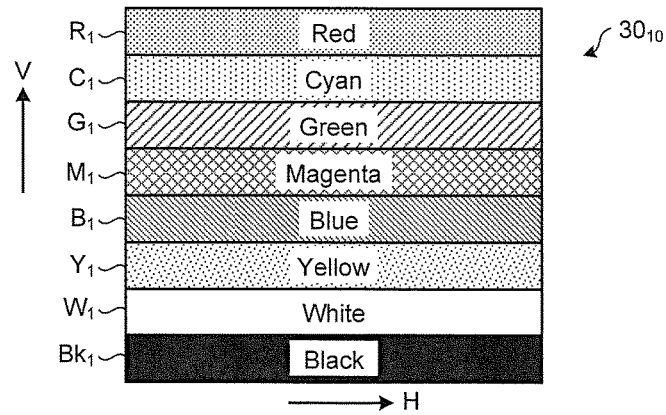
FIGS. 9A, 9B, and 9C are diagrams illustrating examples of adjustment projected images usable in the second embodiment.
Figure 9B:
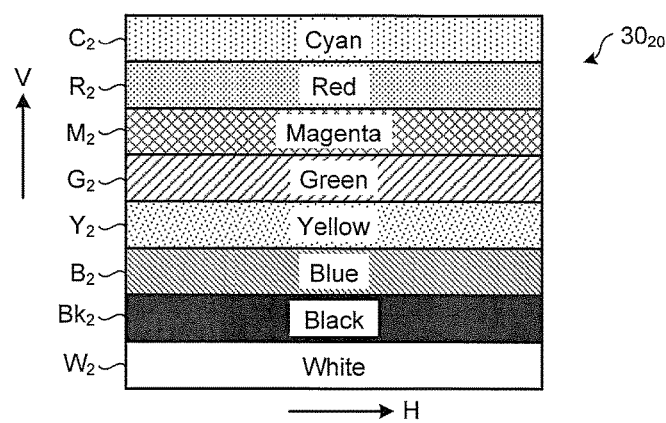
Figure 9C:
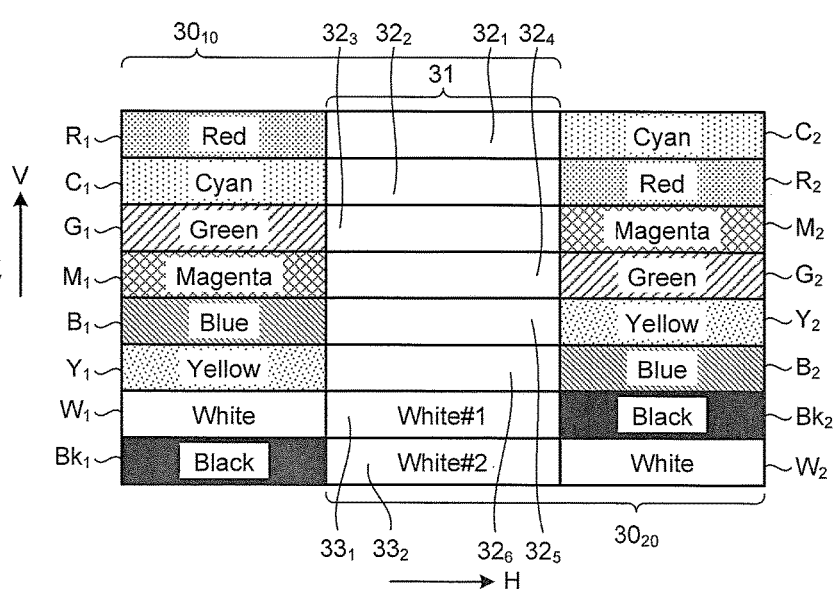

FIGS. 9A, 9B, and 9C illustrate examples of adjustment projected images usable in the second embodiment. FIG. 9A illustrates an example of an adjustment projected image $30_n$ output from one projector (e.g., the projector $10_1$). FIG. 9B illustrates an example of an adjustment projected image $30_{20}$ output from the other projector (e.g., the projector $10_2$).

In the adjustment projected images $30_{10}$ and $30_{20}$, color bars in the image horizontal direction of a white (W) color and a black (Bk) color are added to the adjustment projected images $30_1$ and $30_2$ described above. In other words, in the adjustment projected image $30_{10}$ illustrated in FIG. 9A, an area $W_1$ of the W color and an area $Bk_1$ of the Bk color are added. Similarly, in the adjustment projected image $30_{20}$ illustrated in FIG. 9B, an area $W_2$ of the W color and an area $Bk_2$ of the Bk color are added.

In the adjustment projected images $30_{10}$ and $30_{20}$, as for the areas $W_1$ and $Bk_1$ and the areas $W_2$ and $Bk_2$, when the adjustment projected images $30_{10}$ and $30_{20}$ are made adjacent to each other with their projection heights matched and with the vertical sizes of the images matched, a pair of the W color and the Bk color are arranged in the respective areas positioned correspondingly.

As an example, as illustrated in FIG. 9A and FIG. 9B, in the adjustment projected image $30_{20}$, the area $Bk_2$ is arranged in the position corresponding to the area $W_1$ of the adjustment projected image $30_{10}$. Similarly, in the adjustment projected image $30_{20}$, the area $W_2$ is arranged in the position corresponding to the area $Bk_1$ of the adjustment projected image $30_{10}$.

The adjustment projected images $30_{10}$ and $30_{20}$ thus configured as above are projected with their projection heights matched, with the vertical sizes of the projected images matched, so that the overlapping area 31 in which the adjustment projected images $30_{10}$ and $30_{20}$ overlap is formed as exemplified in FIG. 9C. Resultantly, formed are overlapping areas $33_1$ and $33_2$ in which the W color and the Bk color overlap in the overlapping area 31. Here, the overlapping area $33_1$ is an area onto which the W color by the projector $10_1$ is projected, whereas the overlapping area $33_2$ is an area onto which the W color by the projector $10_2$ is projected.

Figure 10:
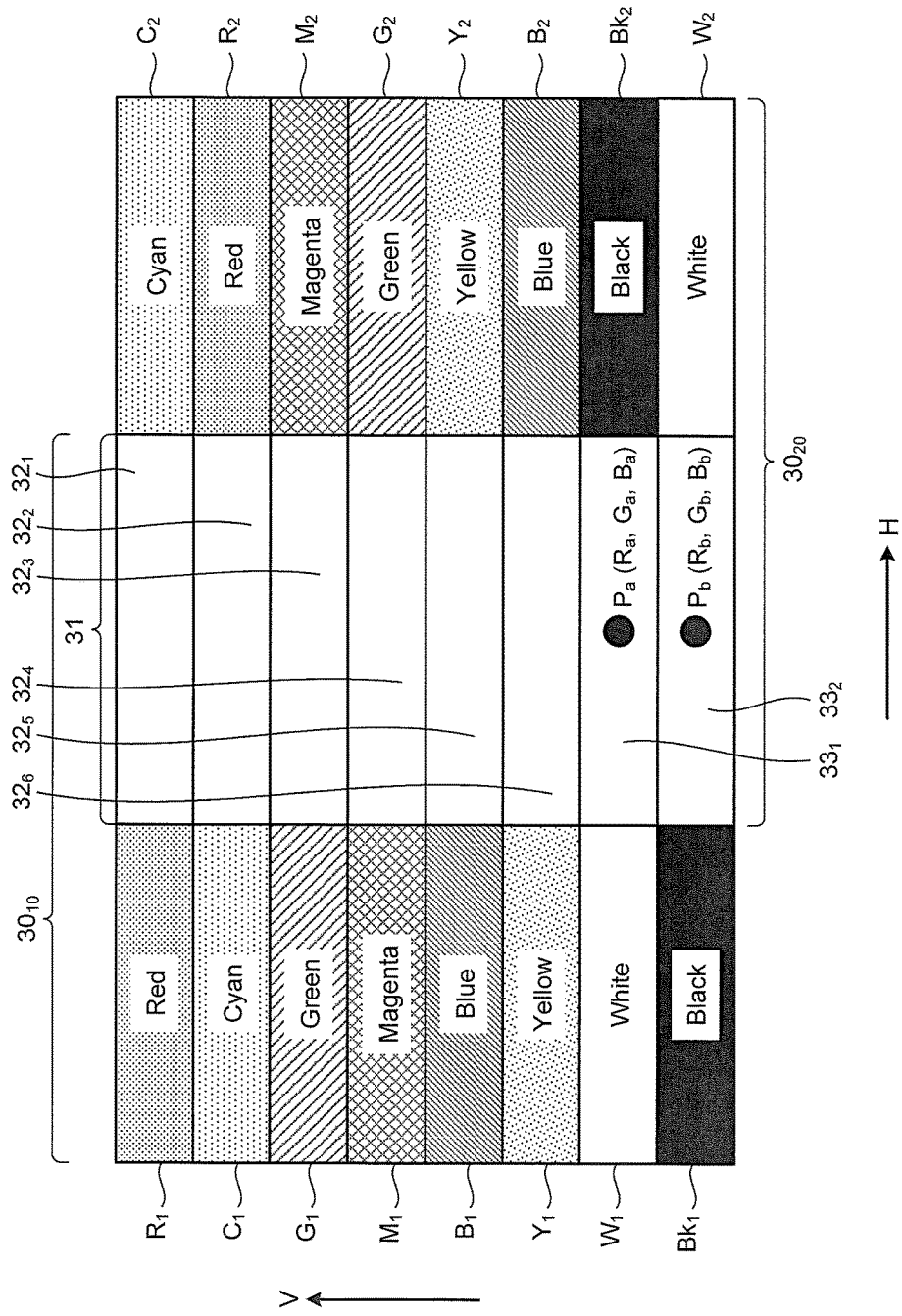
FIG. 10 is a diagram illustrating an example of an adjustment projected image usable in the second embodiment.

In the second embodiment, taken are projected images containing the overlapping areas $33_1$ and $33_2$ by the camera 13. The analyzing unit 120 detects color components (RGB values) at positions of a point $P_a$ within the overlapping area $33_1$ and a point $P_b$ within the overlapping area $33_2$ from the captured image data as exemplified in FIG. 10. The positions of the point $P_a$ and the point $P_b$ may be, for example, the central parts of the respective overlapping areas $33_1$ and $33_2$.

The controller 121' calculates a brightness Y in accordance with Formula (I) below for each of a color component $P_a$ ($R_a$, $G_a$, $B_a$) detected at the point $P_a$ and a color component $P_b$ ($R_b$, $G_b$, $B_b$) detected at the point $P_b$:

$$Y=0.299 \times R+0.587 \times G+0.114 \times B \quad (1)$$

The controller 121' compares a brightness $Y_a$ calculated for the overlapping area $33_1$ with a brightness $Y_b$ calculated for the overlapping area $33_2$. Following the comparison, the second control data is generated so as to reduce the brightness of a projector having a higher value of the brightness Y between the projectors $10_1$ and $10_2$, and matches the brightnesses of the projecting light between the projectors $10_1$ and $10_2$. When the relation between the brightness $Y_a$ and the brightness $Y_b$ is $Y_a > Y_b$, for example, it is considered that the coefficient indicated by the second control data for the projector $10_2$ is set to be 1, whereas the coefficient indicated by the second control data for the projector $10_1$ is set to be $Y_b/Y_a$.

Figure 11:
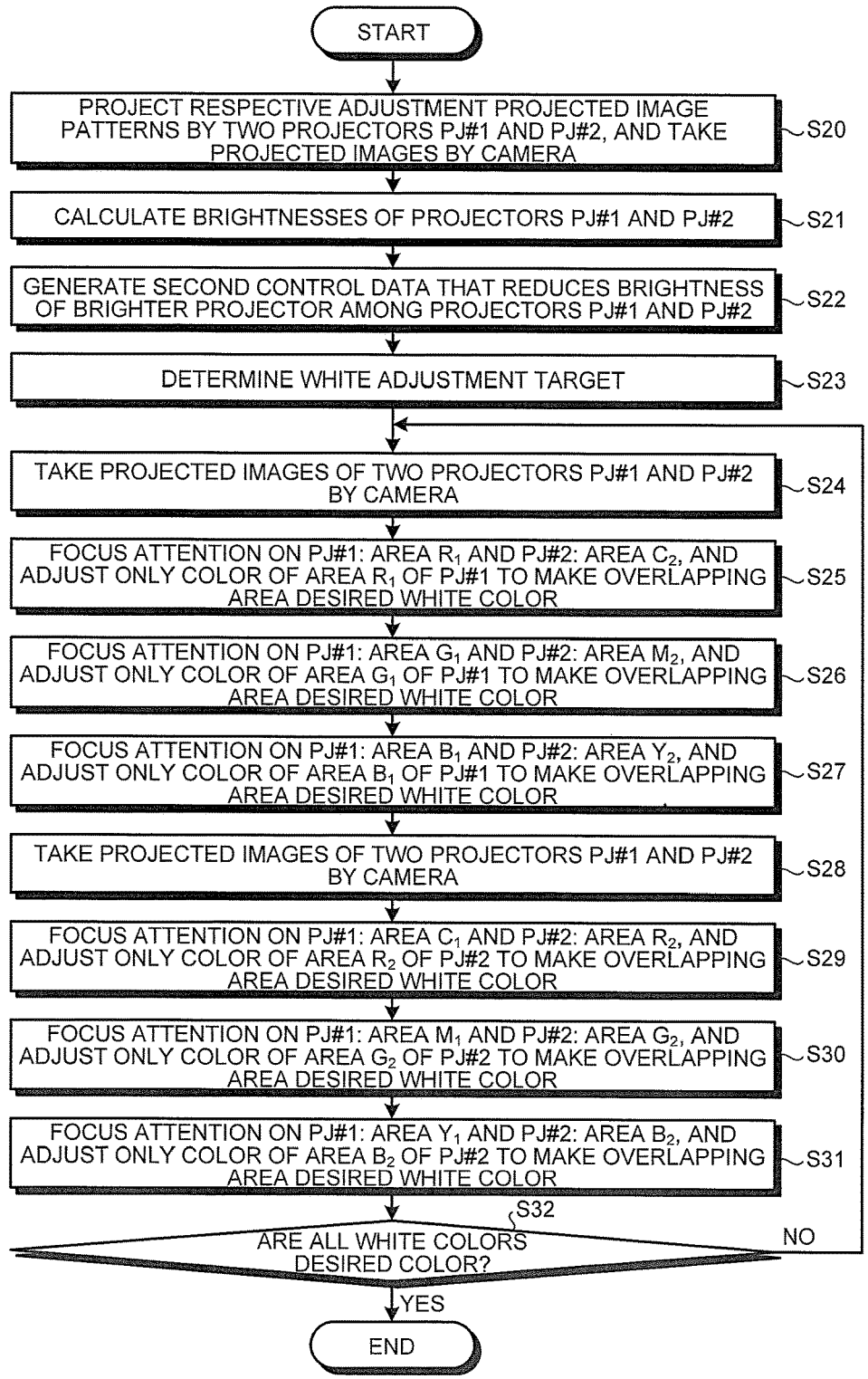
FIG. 11 is a flowchart illustrating an example of adjustment processing according to the second embodiment.

FIG. 11 is a flowchart illustrating an example of adjustment processing according to the second embodiment. In FIG. 11, at Step S20, the adjustment projected images $30_{10}$ and $30_{20}$ are projected onto the screen 14 by the two projectors $10_1$ and $10_2$ so that the overlapping area 31 containing the overlapping areas $33_1$ and $33_2$ is formed. The projected images are taken by the camera 13 so as to contain at least the overlapping areas $33_1$ and $33_2$.

At the next Step S21, the analyzing unit 120 analyzes the color components at the points $P_a$ and $P_b$ from the captured image data of the projected images. Based on the color components analyzed by the analyzing unit 120, the controller 121' calculates the brightnesses $Y_a$ and $Y_b$ of the projecting light of the projectors $10_1$ and $10_2$ as described above.

At the next step S22, the controller 121' compares the brightnesses $Y_a$ and $Y_b$ calculated at Step S21. Based on the comparison result of the brightnesses $Y_a$ and $Y_b$, the controller 121' generates the second control data that matches the brightness of the projected light by a projector of which brightness Y is higher to the brightness of the projected light by a projector of which brightness Y is lower between the projectors $10_1$ and $10_2$, and supplies the second control data to the projectors $10_1$ and $10_2$. The second control data may be supplied only to the projector of which brightness Y is higher.

At the next Step S23, the controller 121' determines the color component P (R, G, B) used to calculate the higher brightness Y between the brightnesses $Y_a$ and $Y_b$ calculated at Step S21 as the standard white color, that is, the desired white color.

Hue and chroma adjustment processing on the adjustment projected images $30_{10}$ and $30_{20}$ is performed as described in the flowcharts in FIG. 5A and FIG. 5B. Specifically, at Step S24, the projected images are taken by the camera 13 so as to contain the overlapping area 31. The captured image data of the projected images is supplied to the adjusting apparatus 12, and is then analyzed by the analyzing unit 120 to determine the color components of the respective overlapping areas $32_1$ to $32_6$ contained in the overlapping area 31.

At the next Step S25, the controller 121', regarding the area $R_1$ and the area $C_2$, generates the control data that adjusts only the color of the area $R_1$ so as to make the color of the overlapping area $32_1$, in which the area $R_1$ and the area $C_2$ overlap, the desired white color.

At the next Step S26, the controller 121', regarding the area $G_1$ and the area $M_2$, generates the control data that adjusts only the color of the area $G_1$ to make the color of the overlapping area $32_3$, in which the area $G_1$ and the area $M_2$ overlap, the desired white color. Furthermore, at the next Step S27, the controller 121', regarding the area $B_1$ and the area $Y_2$, generates the control data that adjusts only the color of the area $B_1$ to make the color of the overlapping area $32_5$ in which the area $B_1$ and the area $Y_2$ overlap the desired white color.

This example also performs chroma adjustment processing following the hue adjustment processing at Step S25 to Step S27. Specifically, at Step S28, the projected images are taken by the camera 13 so as to contain the overlapping area 31. The captured image data of the projected images is supplied to the adjusting apparatus 12 and is analyzed by the analyzing unit 120 to determine again the color components of the respective overlapping areas $32_1$ to $32_6$ contained in the overlapping area 31.

At the next Step S29, the controller 121', regarding the area $C_1$ and the area $R_2$, generates the control data that adjusts only the color of the area $R_2$ so as to make the color of the overlapping area $32_2$ in which the area $C_1$ and the area $R_2$ overlap the desired white color. At the next Step S30, the controller 121', regarding the area $M_1$ and the area $G_2$, generates the control data that adjusts only the color of the area $G_2$ to make the color of the overlapping area $32_4$ in which the area $M_1$ and the area $G_2$ overlap the desired white color. Furthermore, at the next Step S31, the controller 121', regarding the area $Y_1$ and the area $B_2$, generates the control data that adjusts only the color of the area $B_2$ so as to make the color of the overlapping area $32_6$ in which the area $Y_1$ and the area $B_2$ overlap the desired white color.

At the next Step S32, the projected images are taken by the camera 13, for example, so as to contain the overlapping area 31; and the analyzing unit 120 analyzes the captured image data to determine the color components of the respective overlapping areas $32_1$ to $32_6$. Based on the analysis result by the analyzing unit 120, the controller 121' determines whether the colors of the respective overlapping areas $32_1$ to $32_6$ are the desired white color. Actually, the controller 121' may determine whether the color components of the respective overlapping areas $32_1$ to $32_6$ fall within a certain range with respect to the color component of the desired whiter color.

If the controller 121' determines that the colors of the respective overlapping areas $32_1$ to $32_6$ are the desired white color, a series of processing by the flowchart in FIG. 11 ends. In this way, the brightnesses, hues, and chromas of the projected images are matched between the projectors $10_1$ and $10_2$.

When the controller 121' determines that the colors of the respective overlapping areas $32_1$ to $32_6$ are not the desired white color, the processing returns to Step S24. The areas $R_1$, $G_1$, $B_1$, $R_2$, $G_2$, and $B_2$, which have been already adjusted, are further adjusted at Step S25 to Step S31.

Thus, the second embodiment matches the brightnesses of the projecting light between the two projectors $10_1$ and $10_2$ and then performs color-matching adjustment, thereby enabling higher precision of adjustment.

Third Embodiment

Next, a third embodiment is described. The third embodiment adds a pattern having gradation to the adjustment projected images $30_1$ and $30_2$ according to the first embodiment described above, thereby enabling a check of halftones for the respective RGB colors.

Figure 12:
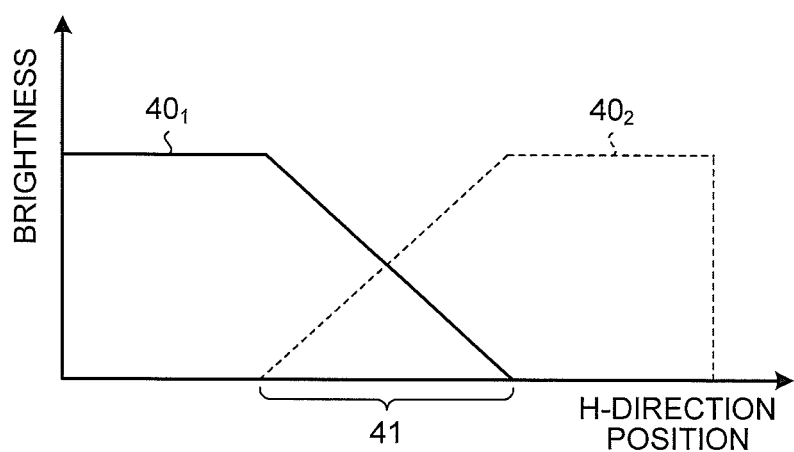
FIG. 12 is a diagram schematically illustrating a pattern having gradation according to a third embodiment.

Patterns having gradation according to the third embodiment are outlined with reference to FIG. 12. Considered are, for example, an area $40_1$ having gradation whose brightness decreases with a constant gradient from a certain position from left to right in the horizontal (H) direction; and an area $40_2$ whose brightness increases with a constant gradient from a certain position from right to left in the horizontal direction. When these areas $40_1$ and $40_2$ are overlapped with their starting points and ending points of the gradients matched, an overlapping area 41 in which the gradients overlap gives uniform brightness.

Figure 13A:
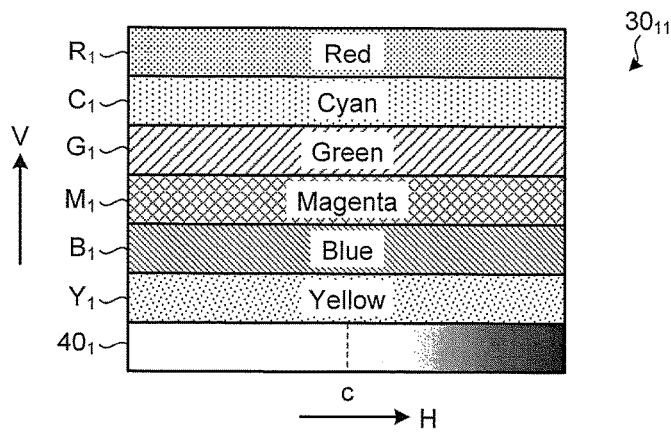
FIGS. 13A, 13B, and 13C are diagrams for illustrating an example of using a gradation pattern according to the third embodiment applied for adjustment projected images.
Figure 13B:
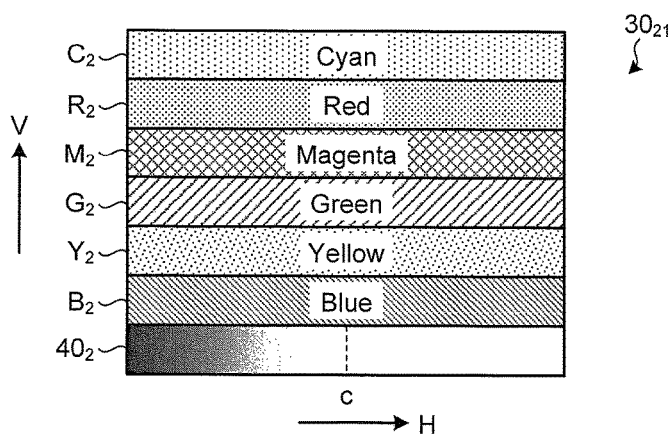
Figure 13C:
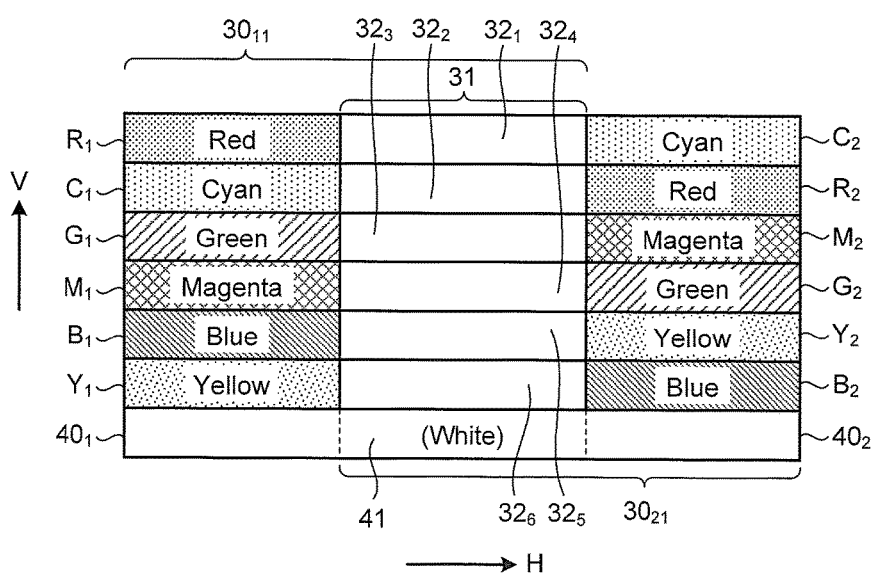

Described with reference to FIG. 13A to FIG. 13C is an example in which the gradation patterns illustrated in FIG. 12 are used for adjustment projected images. In FIG. 13A to FIG. 13C, the parts common to FIG. 2 illustrated above are given with the same reference numerals and are omitted to be described in detail.

FIG. 13A illustrates an example of an adjustment projected image $30_{11}$ output from one projector (e.g., the projector $10_1$). FIG. 13B illustrates an example of an adjustment projected image $30_{21}$ output from the other projector (e.g., the projector $10_2$).

In the adjustment projected images $30_{11}$ and $30_{21}$, the areas $40_1$ and $40_2$ containing achromatic gradation patterns are added to the adjustment projected images $30_1$ and $30_2$ described above. Here, the area $40_1$ has, for example, a white color to the left of a central position c in the horizontal direction, decreasing brightness with a constant gradient rightward from the position c, and a black color on the right end. The area $40_2$ has a white color to the right of the central position c in the horizontal direction, decreasing brightness with the same gradient as the area $40_1$ leftward from the position c, and a black color on the left end. The range of the gradation is not limited to this example.

Thus configured adjustment projected images $30_{11}$ and $30_{21}$ are projected with their projection heights matched and with the vertical sizes of the projected images matched, so that the overlapping area 41 in which the adjustment projected images $30_{11}$ and $30_{21}$ overlap is formed as exemplified in FIG. 13C. Here, as described with reference to FIG. 12, the overlapping area 41 is formed by the projected positions of the adjustment projected images $30_{11}$ and $30_{21}$ adjusted so as to match the starting point and the ending point of the gradient of the brightness of the area $40_1$ and the ending point and the starting point of the gradient of the brightness of the area $40_2$.

When the halftones of the respective RGB colors are correctly adjusted in each of the projectors $10_1$ and $10_2$, the formed overlapping area 41 must be a uniform white color. In other words, when the halftones of the respective RGB colors are not correctly adjusted in at least one of the projectors $10_1$ and $10_2$, the overlapping area 41 is nonuniform in color and brightness. Thus, by using the adjustment projected images $30_{11}$ and $30_{21}$ according to the third embodiment, whether the halftones are correctly adjusted can be determined.

Modification of Third Embodiment

A modification of the third embodiment is described. The modification of the third embodiment gives gradations to the respective areas $R_1$, $C_1$, $G_1$, $M_1$, $B_1$, $Y_1$, $C_2$, $R_2$, $M_2$, $G_2$, $Y_2$, and $B_2$ of the adjustment projected images $30_1$ and $30_2$ according to the first embodiment in a direction orthogonal to the direction in which the adjustment projected images $30_1$ and $30_2$ are arranged, thereby enabling a check of the halftones for the respective RGB colors.

Figure 14A:
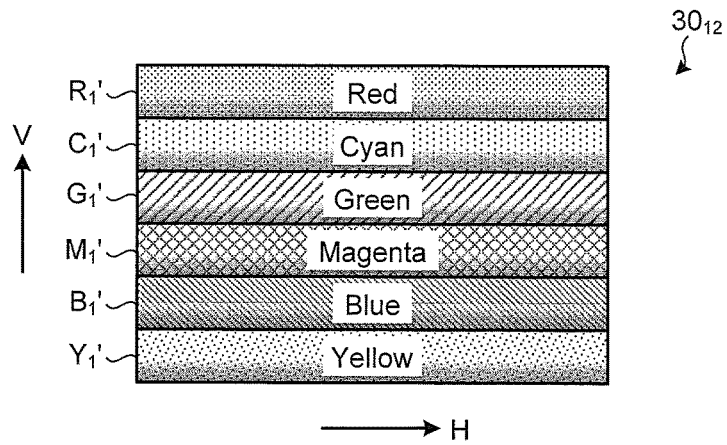
FIGS. 14A, 14B, and 14C are diagrams for illustrating an example of using a gradation pattern according to a modification of the third embodiment applied for adjustment projected images.
Figure 14B:
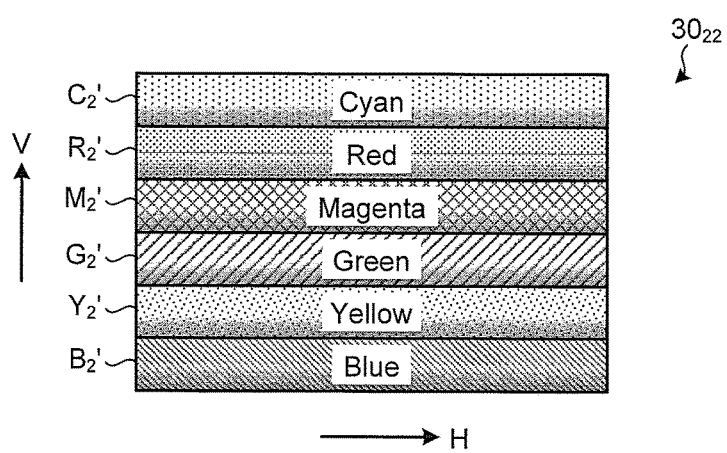
Figure 14C:
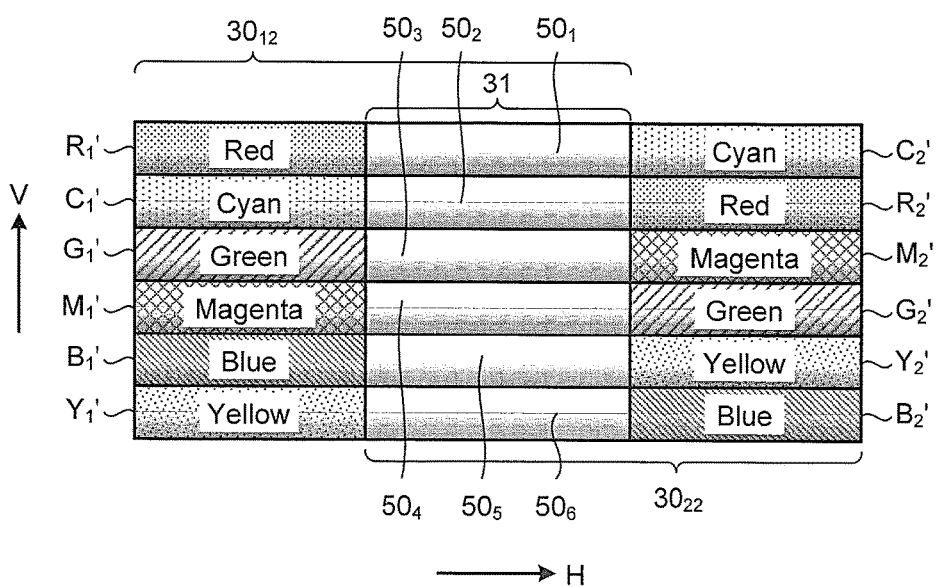

Described with reference to FIG. 14A to FIG. 14C is an example in which gradation patterns according to the modification of the third embodiment are used for adjustment projected images. In FIG. 14A to FIG. 14C, the parts common to FIG. 2 are given the same reference numerals and are omitted to be described in detail.

FIG. 14A illustrates an example of an adjustment projected image $30_{12}$ output from one projector (e.g., the projector $10_1$). FIG. 14B illustrates an example of an adjustment projected image $30_{22}$ output from the other projector (e.g., the projector $10_2$).

An area $R_1'$ exemplified in FIG. 14A is, for example, given gradation in brightness for the R color in the vertical (V) direction. In the example in FIG. 14A, the upper half of the area $R_1'$ has the brightest, original R color; the lower half thereof has downward decreasing brightness with a constant gradient; and the lower end thereof is the least bright, that is, a black color.

The same applies to the other areas $C_1'$, $G_1'$, $M_1'$, $B_1'$, $Y_1'$, $C_2'$, $R_2'$, $M_2'$, $G_2'$, $Y_2'$, and $B_2'$. Specifically, with reference to FIG. 14A and FIG. 14B, in the respective areas $C_1'$, $G_1'$, $M_1'$, $B_1'$, and $Y_1'$; as well as $C_2'$, $R_2'$, $M_2'$, $G_2'$, $Y_2'$, and $B_2'$, the upper half thereof has the brightest, original colors; the lower half thereof has downward decreasing brightness with a constant gradient; and the lower end thereof is the least bright, that is, a black color.

Thus configured adjustment projected images $30_{12}$ and $30_{22}$ are projected with their projection heights matched and with the vertical sizes of the projected images matched, so that the overlapping area 31 is formed in which the adjustment projected images $30_{12}$ and $30_{22}$ overlap.

The overlapping area 31 contains overlapping areas $50_1$, $50_2$, $50_3$, $50_4$, $50_5$, and $50_6$ in which the respective mutually complementary areas overlap as exemplified in FIG. 14C.

When the halftones of the respective RGB colors are correctly adjusted in each of the projectors $10_1$ and $10_2$, each of the overlapping areas $50_1$ to $50_6$ must be a vertical achromatic gradation display in which the brightness changes from white to black equally in the vertical direction. When there is any overlapping area not having the desired gradation display between the overlapping areas $50_1$ to $50_6$, it can be determined at one time which of the RGB color of the projectors $10_1$ and $10_2$ is not a correct gradation display from the combination of a primary color and a complementary color constituting the overlapping area concerned.

The adjustment of the hue and the chroma can be performed using the upper parts of the respective overlapping areas $50_1$ to $50_6$, which have no gradation.

Figure 15A:
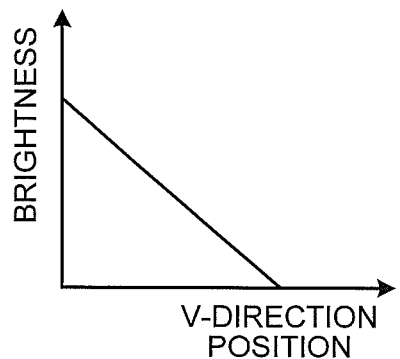
FIGS. 15A, 15B, and 15C are diagrams for illustrating examples of gradation patterns according to the modification of the third embodiment.
Figure 15B:
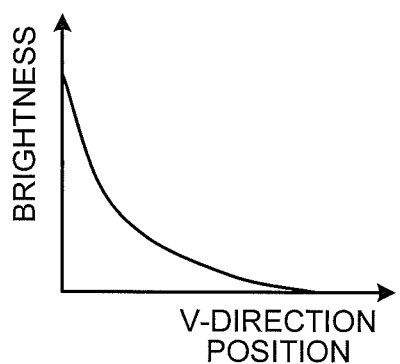
Figure 15C:
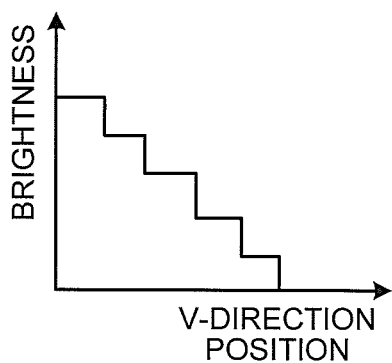

As long as the changes in brightness of the gradation are equal among the areas $R_1'$ $C_1'$, $G_1'$, $M_1'$, $B_1'$, and $Y_1'$; as well as $C_2'$, $R_2'$, $M_2'$, $G_2'$, $Y_2'$, and $B_2'$, this gradation pattern is not limited. The change in brightness may be linear as exemplified in FIG. 15A, for example. It may be curved as exemplified in FIG. 15B. The brightness may change stepwise as exemplified in FIG. 15C.

Other Embodiments

The adjusting apparatus 12 according to the embodiments may configure the analyzing unit 120 and the controller 121 (controller 121') as mutually independent pieces of hardware. The functions of the analyzing unit 120 and the controller 121 (controller 121') may be achieved through an image adjusting program operating on a central processing unit (CPU).

When the functional units of the adjusting apparatus 12 are achieved through the image adjusting program operating on the CPU, the adjusting apparatus 12 includes at least the CPU, a read only memory (ROM), a random access memory (RAM), and a data interface (I/F). The CPU controls the entire operation of the adjusting apparatus 12 using the RAM as a work memory in accordance with the program stored in the ROM.

The data I/F is used as an interface for supplying the first and the second control data to the image processing units $100_2$ and $100_2$ of the projectors $10_2$ and $10_2$, respectively. The operation of the camera 13 may be controlled through the data I/F. The adjusting apparatus 12 may further include a communication I/F that performs communications through a network.

The image adjusting program according to the embodiments is stored in a computer connected to a network and is provided by being downloaded via the network. The image adjusting program according to the embodiments may be provided or distributed via the network. The computer program may be stored in the ROM in advance and provided.

Without being limited thereto, the computer program according to the embodiments may be recorded and provided in a computer-readable recording medium such as a compact disc (CD) and a digital versatile disc (DVD) as an installable or executable file. In this case, the image adjusting program is supplied to the adjusting apparatus 12 via an external drive device connected to the data I/F, for example.

The image adjusting program according to the embodiments has, for example, a module structure including the above units (the analyzing unit 120 and the controller 121 or the controller 121'). As actual hardware, the CPU reads the image adjusting program from the ROM, for example, and executes it, thereby loading the above units into a main storage (e.g., the RAM) and generating the units in the main storage.

Although the above describes that the camera 13, the adjusting apparatus 12, the image outputting apparatus 11, and the projector $10_1$ (projector $10_2$) are independent pieces of hardware, which is not limited to this configuration.

The adjusting apparatus 12 and the image outputting apparatus 11 may be integrally configured, for example; and the camera 13 may further be added to the configuration. In this case, the configuration integrally including the camera 13, the adjusting apparatus 12, and the image outputting apparatus 11 can be achieved by using multifunctional mobile phones such as smartphones and by using tablet computers.

The camera 13, the adjusting apparatus 12, and the image outputting apparatus 11 can also be incorporated into the projector $10_1$ (projector $10_2$). In this case, the same adjustment processing as described above can be performed using the projector $10_1$, for example, incorporating the camera 13, the adjusting apparatus 12, and the image outputting apparatus 11 and another projector corresponding to the control data by the controller 121 or the first and the second control data by the controller 121'.

Without being limited thereto, also may be used are: the projector $10_1$ incorporating the camera 13, the adjusting apparatus 12, and the image outputting apparatus 11; and another projector not corresponding to the control data by the controller 121 or the first and the second control data by the controller 121'. In this case, the adjustment projected images $30_1$ and $30_2$ are projected by the projector $10_1$ and the other projector, respectively, so that the overlapping area 31 is formed; and the projected images containing the overlapping area 31 are taken by the camera 13 incorporated with the projector $10_1$. Relating to this, the description of the projector $10_2$ in the flowchart in FIG. 5A is replaced with the other projector, and the adjustments of the areas $R_1$, $G_1$, and $B_1$ are performed by the projector $10_1$, thereby enabling hue adjustment of the hues.

The present embodiment is able to easily perform color matching of projected images between a plurality of projectors.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multi-projector system comprising:
two or more projectors including a first projector and a second projector;
an image outputting apparatus implemented by CPU configured to output respective images to the two or more projectors; and
an adjusting apparatus implemented by CPU configured to adjust images projected by the two or more projectors, wherein each of the projectors comprises
a liquid crystal on silicon (LCOS) device configured to modulate light from a light source in accordance with an input image so as to emit the modulated light as a projected image; and
a color adjusting unit implemented by CPU and configured to control the input image in accordance with first control data so as to adjust colors of the projected image,
the image outputting apparatus comprises
an outputting unit implemented by CPU and configured
to arrange red, green, and blue as three primary colors and cyan, magenta, and yellow as three complementary colors that are each complementary to a corresponding one of the three primary colors in two areas positioned correspondingly to each of a first adjustment image and a second adjustment image having respective areas obtained by dividing an image frame corresponding to the projected images of the first projector and the second projector in a predetermined direction and
to output the first adjustment image and the second adjustment image as the input images of the first projector and the second projector respectively, and
the adjusting apparatus comprises
a camera configured to take a projected image projected onto a projection medium and to output a captured image;
an analyzing unit implemented by CPU and configured to, when a first adjustment projected image projected onto the projection medium based on the first adjustment image by the first projector and a second adjustment projected image projected onto the projection medium based on the second adjustment image by the second projector are projected and arranged in the predetermined direction with the positions of the respective areas matched and when there is an overlapping area in the first adjustment projected image and the second adjustment projected image, analyze an image of the overlapping area from the captured image so as to determine a color component; and
a controller implemented by CPU configured to generate and output the first control data for controlling at least the color adjusting unit of the first projector so that a mixed color of one of the primary colors and one of the complementary colors with the overlapping area is an achromatic color in accordance with the color component determined as a result of the analysis by the analyzing unit, wherein,
the controller is, for each primary color, configured to
generate and output the first control data that causes the color adjusting unit of the first projector to change the color of an area in which a primary color is arranged, and
adjust a color of images projected by the first projector by placing, at first adjusted positions on an xy-chromaticity diagram, positions of the primary colors projected by the first projector on the xy-chromaticity diagram,
wherein, the first adjusted positions are set by compositing each of the primary colors with another one of the primary colors so that the positions of the primary colors are moved on a side of a color gamut of which apexes are original positions of the primary colors, from the positions of the apexes of the color gamut,
each of the first adjusted positions is set so that a line passing through a position of a determined achromatic color on the xy-chromaticity diagram also passes through the first adjusted position being set and a position of one of the complementary colors projected by the second projector on the xy-chromaticity diagram, and
one of the first adjusted positions is applied to an entire image projected by the first projector, through the first control data.

2. The multi-projector system according to claim 1, wherein
the controller is configured to, when the color component of the overlapping area becomes an achromatic color as a result of the change of the color of the area in which a primary color is arranged by the color adjusting unit of the first projector, further generate and output the first control data that causes the color adjusting unit of the second projector to change the color of the area in which a primary color is arranged in accordance with the color component of the overlapping area extracted for the two areas positioned correspondingly to each other in which a complementary color is projected in the first adjustment projected image and a primary color is projected in the second adjustment projected image.

3. The multi-projector system according to claim 2, wherein
the controller is configured to adjust, after setting the first adjusted positions, the primary colors projected by the second projector, by placing, at second adjusted positions on a xy-chromaticity diagram, positions of the primary colors projected by the second projector on the xy-chromaticity diagram,
wherein, the second adjusted positions are set by compositing each of the primary colors projected by the second projector with another one of the primary colors projected by the second projector so that the positions of the primary colors projected by the second projector are moved on a side of a color gamut of which apexes are original positions of the primary colors projected by the second projector, from the positions of the apexes of the color gamut,
each of the second adjusted positions is set so that a line passing through the position of the determined achromatic color also passes through the second adjusted position being set and a position of one of the complementary colors on a side of the adjusted color gamut of which apexes are the first adjusted positions, and
with the second adjusted positions are applied to an entire image projected by the second projector.

4. The multi-projector system according to claim 1, wherein
each of the projectors further comprises a brightness adjusting unit implemented by CPU and configured to adjust the brightness of the projected image in accordance with second control data, the outputting unit is configured further to
add a first area and a second area to each of the first adjustment image and the second adjustment image, and
arrange a white color and a black color in the two respective added first areas and a black color and a white color in the two respective added second areas, the added first areas being at corresponding positions of the first adjustment image and the second adjustment image, the added second areas being at corresponding positions of the first adjustment image and the second adjustment image, the analyzing unit is configured to determine a first brightness of the overlapping area of the two added first areas and a second brightness of the overlapping area of the two added second areas, and the controller is configured to generate and output the second control data that causes the brightness adjusting unit of one of the projectors, which corresponds to an area in which the white color contained in the overlapping area having a higher brightness out of the first brightness and the second brightness is arranged among the first projector and the second projector, to control so as to make the brightness of the overlapping area having the higher brightness to a lower brightness out of the first brightness and the second brightness.

5. The multi-projector system according to claim 4, wherein
the controller is configured to perform the generation and the outputting of the second control data prior to the generation and the outputting of the first control data.

6. The multi-projector system according to claim 1, wherein
the controller determines the determined achromatic color based on the image projected by the second projector, and adjusts the position of one of the primary colors projected by the first projector on the xy-chromaticity diagram while fixing the position of one of the complementary colors projected by the second projector on the xy-chromaticity diagram, so that the line passes through the position of the determined achromatic color.

7. The multi-projector system according to claim 1, wherein
the outputting unit displays a plurality of primary colors among red, green and blue as the first adjustment image and displays a plurality of complementary colors among cyan, magenta, and yellow as the second adjustment image, and
the controller adjusts each primary color projected by the first projector.

8. A projector, comprising:
a liquid crystal on silicon (LCOS) device configured to modulate light from a light source in accordance with an input image to emit the modulated light as a projected image;
a color adjusting unit implemented by CPU and configured to control the input image in accordance with control data to adjust chromaticity of the projected image;
a camera configured to take a projected image projected onto a projection medium and output a captured image;
an analyzing unit implemented by CPU and configured to, when areas are provided by dividing an image frame corresponding to the projected image in a predetermined direction, two of which areas being positioned correspondingly to each other,
a first adjustment projected image having red, green, and blue as three primary colors and cyan, magenta, and yellow as three complementary colors that are each complementary to a corresponding one of the three primary colors projected from the projector, and
a second adjustment projected image having red, green, and blue as three primary colors and cyan, magenta, and yellow as three complementary colors that are each complementary to a corresponding one of the three primary colors projected from another projector,
the first adjustment projected image projected onto the projection medium based on a first adjustment image and the second adjustment projected image projected onto the projection medium based on a second adjustment image being arranged in the predetermined direction with the positions of the respective areas matched, and when there is an overlapping area in the first adjustment projected image and the second adjustment projected image, analyze an image of the overlapping area from the captured image so as to determine a color component; and
a controller implemented by CPU configured to generate and output the control data for controlling the color adjusting unit so that a mixed color of one of the primary colors and one of the complementary colors within the overlapping area becomes an achromatic color in accordance with the color component determined as a result of the analysis by the analyzing unit, wherein,
the controller is configured, for each primary color, to
generate and output the first control data that causes the color adjusting unit of the projector to change the color of an area in which a primary color is arranged, and
adjust a color of images projected by the projector by placing, at first adjusted positions on an xy-chromaticity diagram, positions of the primary colors projected by the projector on the xy-chromaticity diagram,
wherein, the first adjusted positions are set by compositing each of the primary colors with another one of the primary colors so that the positions of the primary colors are moved on a side of a color gamut of which apexes are original positions of the primary colors, from the positions of the apexes of the color gamut,
each of the first adjusted positions is set so that a line passing through a position of a determined achromatic color on the xy-chromaticity diagram also passes through the first adjusted position being set and a position of one of the complementary colors projected by the another projector on the x-y chromaticity diagram, and
one of the first adjusted positions is applied to an entire image projected by the first projector, through the first control data.

9. A method for adjusting an image, performed by CPU, comprising:
when areas are provided by dividing an image frame corresponding to a projected image in a predetermined direction, in two of the areas positioned correspondingly to each other, a first adjustment projected image projected onto a projection medium by a first projector based on a first adjustment image and a second adjustment projected image projected onto the projection medium by a second projector based on a second adjustment image are projected and arranged in the predetermined direction with the positions of the respective areas matched, the first adjustment image and the second adjustment image having red, green, and blue as three primary colors and cyan, magenta, and yellow as three complementary colors that are each complementary to a corresponding one of the three primary colors, and when there is an overlapping area in the first adjustment projected image and the second adjustment projected image, analyzing an image of the overlapping area from a captured image of projected images projected onto the projection medium so as to determine a color component; and generating and outputting control data for adjusting at least the color of the first adjustment projected image projected by the first projector so that a mixed color of one of the primary colors and one of the complementary colors within the overlapping area becomes an achromatic color in accordance with the color component determined as a result of the analysis at the analyzing, wherein the method further comprises, for each primary color:

generating and outputting first control data that causes the first projector to change the color of an area in which a primary color is arranged, and adjusting a color of images projected by the first projector by placing, at first adjusted positions on an xy-chromaticity diagram, positions of the primary colors projected by the projector on the xy-chromaticity diagram, wherein, the first adjusted positions are set by compositing each of the primary colors with another one of the primary colors so that the positions of the primary colors are moved on a side of a color gamut of which apexes are original positions of the primary colors, from the positions of the apexes of the color gamut, each of the first adjusted positions is set so that a line passing through a position of a determined achromatic color on the xy-chromaticity diagram also passes through the first adjusted position being set and a position of one of the complementary colors projected by the another projector on the x-y chromaticity diagram, and one of the first adjusted positions is applied to an entire image projected by the first projector, through the first control data.

10. A computer program product comprising: a non-transitory computer readable medium; and an image adjusting program stored in the non-transitory computer readable medium and that causes a computer to implement the method for adjusting an image according to claim 9.

\* \* \* \* \*